(12) United States Patent
Lavasanijou et al.

(10) Patent No.: US 11,205,205 B2
(45) Date of Patent: Dec. 21, 2021

(54) AUTHENTIC REVIEW PLATFORM

(71) Applicants: Reza Lavasanijou, San Mateo, CA (US); Farbod Rohani, San Mateo, CA (US)

(72) Inventors: Reza Lavasanijou, San Mateo, CA (US); Farbod Rohani, San Mateo, CA (US)

( * ) Notice: Subject to any disclaimer, the term of this patent is extended or adjusted under 35 U.S.C. 154(b) by 0 days.

(21) Appl. No.: 16/944,358

(22) Filed: Jul. 31, 2020

(65) Prior Publication Data
US 2021/0357994 A1 Nov. 18, 2021

Related U.S. Application Data

(60) Provisional application No. 63/023,874, filed on May 13, 2020.

(51) Int. Cl.
*G06Q 30/02* (2012.01)
*G06F 3/0482* (2013.01)

(52) U.S. Cl.
CPC ....... *G06Q 30/0282* (2013.01); *G06F 3/0482* (2013.01); *G06Q 30/0201* (2013.01)

(58) Field of Classification Search
CPC combination set(s) only.
See application file for complete search history.

(56) References Cited

U.S. PATENT DOCUMENTS

| 8,504,486 | B1 * | 8/2013 | Pinto | G06Q 30/0631 705/347 |
| 2004/0230511 | A1 * | 11/2004 | Kannan | G06Q 40/00 705/35 |
| 2010/0332296 | A1 * | 12/2010 | Gharabally | G06Q 30/02 705/14.2 |
| 2011/0060666 | A1 * | 3/2011 | Gromek | G06F 3/0482 705/27.2 |
| 2015/0199770 | A1 * | 7/2015 | Wallenstein | G06Q 50/01 705/26.2 |
| 2016/0110789 | A1 * | 4/2016 | Gilb | G06Q 30/0619 705/26.44 |

OTHER PUBLICATIONS

Jiang, S., Cai, S., Olle Olle, G. and Qin, Z. (2015), "Durable product review mining for customer segmentation", Kybernetes, vol. 44 No. 1, pp. 124-138. https://doi.org/10.1108/K-06-2014-0117 (Year: 2015).*

* cited by examiner

*Primary Examiner* — Arif Ullah
(74) *Attorney, Agent, or Firm* — Summit Patent Group

(57) ABSTRACT

One or more systems and/or techniques for collecting and/or presenting reviews and/or ratings associated with items are provided. A request to perform a review procedure for a first item is received. In response to receiving the request, a first target profile associated with the first item is generated. A second client device associated with a first reviewer displays a review platform interface including one or more selectable inputs associated with one or more items. A first selectable input is associated with the first item. A request to review the first item is received from the second client device via a selection of the first selectable input. Based upon the first target profile and a first reviewer profile associated with the first reviewer, it is determined that the first reviewer is associated with a first target audience of the first item. Review instructions are transmitted to the second client device.

19 Claims, 13 Drawing Sheets

201

NELLER COFFEE MAKER TARGET PROFILE

AGES: 19-39 — 212

LOCATION: North America — 214

GENDER(S): All — 216

EDUCATION LEVEL: High-school educated — 218

ACTIVITY: searching for coffee-related products, searching for kitchen appliances ... — 220

PAST PURCHASES: Coffee, filters, kitchen appliances, mugs ... — 222

INTERESTS: Energy, machines, fitness, nutrition, household maintenance ... — 224

CATEGORIES/SCORES: Coffee and espresso (Score: 9), Kitchen appliances (Score: 7), Home appliances (Score: 5) — 226

REVIEWER PROFILE

AGE: 21 ⟵ 242

LOCATION: New York City, New York ⟵ 244

GENDER: Female ⟵ 246

EDUCATION LEVEL: High-school diploma ⟵ 248

ACTIVITY: reads coffee-related articles, searches for coffee making methods ... ⟵ 250

PAST PURCHASES: Stay Chill mug, Malpreso milk foamer, Xcellent filters, ProTennis Racket ... ⟵ 252

INTERESTS: Nutrition, wellness, energy ... ⟵ 254

CATEGORIES/SCORES: Tennis equipment (Score: 9), Athletic apparel (Score: 8), Kitchen appliances (Score: 7), Home appliances (Score: 6), Coffee and espresso (Score: 4) ... ⟵ 256

AUTHENTIC REVIEW PLATFORM

RELATED APPLICATION

This application claims the benefit of U.S. Provisional Application No. 63/023,874, filed May 13, 2020, which is incorporated herein by reference in its entirety.

BACKGROUND

Many online sellers may feature reviews and/or ratings associated with products and/or services on their webpage. A user may use the reviews and/or ratings to ascertain the quality of a product and/or service and decide whether to purchase the product and/or service.

SUMMARY

In accordance with the present disclosure, one or more systems and/or techniques for collecting and/or presenting reviews and/or ratings associated with items are provided. In an example, a first request to perform a review procedure for a first item associated with a first entity is received via a first client device associated with the first entity. In response to receiving the first request, a first target profile associated with the first item is generated. A graphical user interface of a second client device associated with a first reviewer is controlled to display a review platform interface comprising one or more selectable inputs associated with one or more items. A first selectable input of the one or more selectable inputs is associated with the first item. A first request to review the first item is received from the second client device via a selection of the first selectable input. Based upon the first target profile associated with the first item and a first reviewer profile associated with the first reviewer, it is determined that the first reviewer is associated with a first target audience of the first item. Review instructions, associated with reviewing the first item, are transmitted to the second client device.

In an example, a first request to perform a review procedure for a first item associated with a first entity is received via a first client device associated with the first entity. One or more first item categories associated with the first item are determined. One or more item category scores associated with the first item and the one or more item categories are determined. A first item category score of the one or more item category scores is associated with the first item and a first item category of the one or more item categories. First reviewer information associated with a first reviewer is received. One or more reviewer categories associated with the first reviewer are determined based upon the first reviewer information. Based upon the first reviewer information, one or more reviewer category scores are determined. The one or more reviewer category scores are associated with the first reviewer and the one or more reviewer categories. A first reviewer category score of the one or more reviewer category scores is associated with the first reviewer and a first reviewer category of the one or more reviewer categories. It is determined that the first reviewer is associated with a first target audience of the first item based upon the one or more item category scores associated with the first item and the one or more reviewer category scores associated with the first reviewer. A graphical user interface of a second client device associated with the first reviewer is controlled to display a review platform interface comprising one or more selectable inputs associated with one or more items in response to determining that the first reviewer is associated the first target audience of the first item. A first selectable input of the one or more selectable inputs is associated with the first item. A first request to review the first item is received from the second client device via a selection of the first selectable input. Review instructions, associated with reviewing the first item, are transmitted to the second client device.

In an example, a review system is introduced. A first request to perform a review procedure for a first item associated with a first entity is received via a first client device associated with the first entity. First target information is received from the first client device associated with the first entity. In response to receiving the first request, a first target profile associated with the first item is generated based upon the first target information. A graphical user interface of a second client device associated with a first reviewer is controlled to display a review platform interface comprising one or more selectable inputs associated with one or more items. A first selectable input of the one or more selectable inputs is associated with the first item. A first request to review the first item is received from the second client device via a selection of the first selectable input. In response to receiving the first request to review the first item, it is determined that the first reviewer is associated with a first target audience of the first item based upon the first target profile associated with the first item and a first reviewer profile associated with the first reviewer. In response to determining that the first reviewer is associated with the first target audience of the first item, review instructions, associated with reviewing the first item, are transmitted to the second client device. A first review of the first item is received from the second client device after the review instructions are transmitted to the second client device. One or more reviews of the first item are received from one or more client devices via the review system. A first rating of the first item is received from the second client device after the review instructions are transmitted to the second client device. One or more ratings of the first item are received from the one or more client devices via the review system. A first item rating is generated based upon a plurality of ratings of the first item. The plurality of ratings of the first item comprises the first rating of the first item received from the second client device and the one or more ratings of the first item received from the one or more client devices. An indication of a quantity of reviews of a plurality of reviews of the first item, an indication of a quantity of ratings of the plurality of ratings of the first item, and/or an indication of the first item rating are displayed on a first item product page associated with purchasing the first item. The plurality of reviews of the first item may comprise the first item review received from the second client device and/or the one or more reviews of the first item received from one or more client devices.

DESCRIPTION OF THE DRAWINGS

FIG. 2B is an illustration of an exemplary target profile.

FIG. 2D is an illustration of an exemplary reviewer profile.

DETAILED DESCRIPTION

Figure 1:
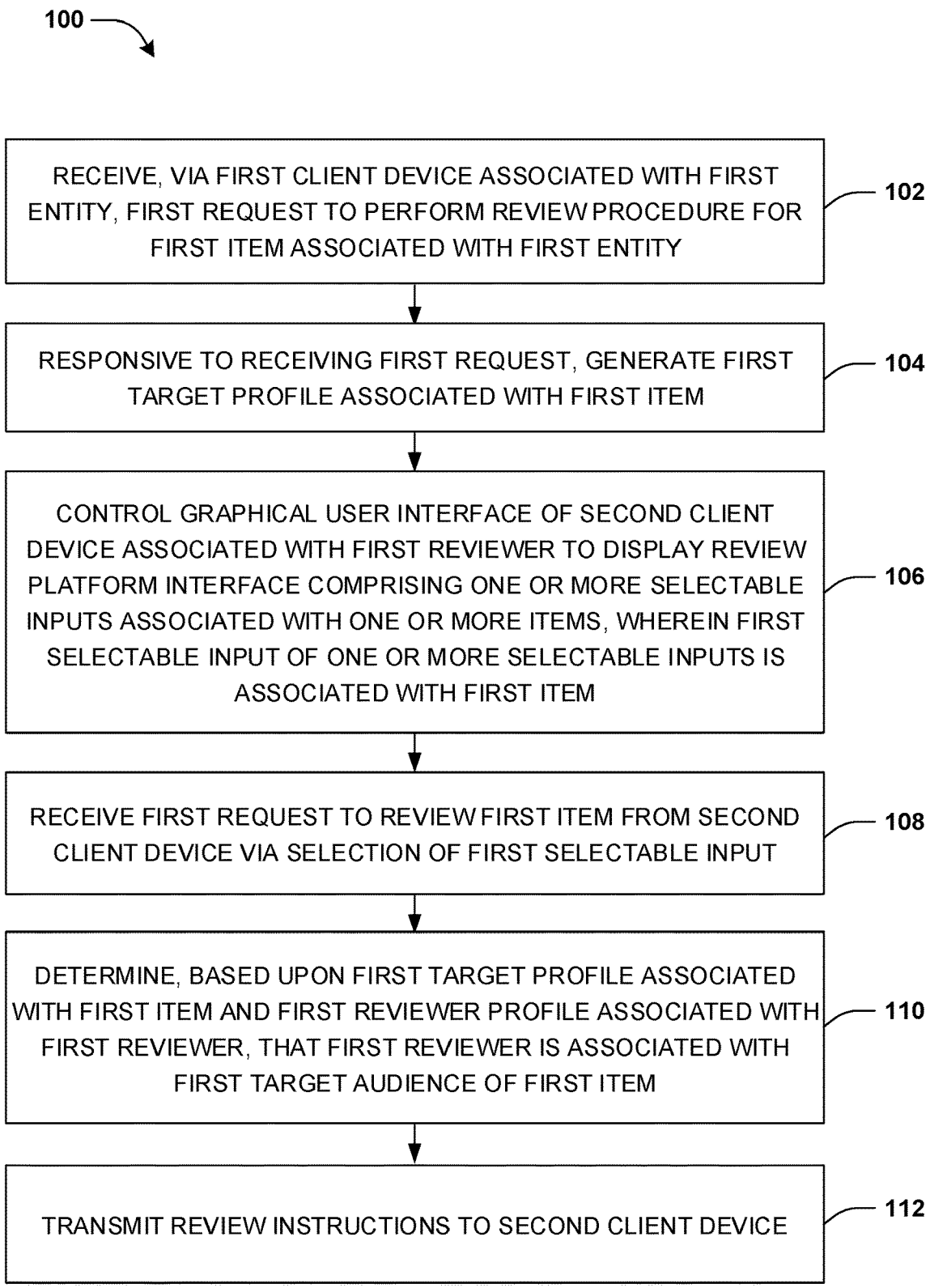
FIG. 1 is an illustration of an exemplary method for collecting and/or presenting reviews and/or ratings associated with items.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for collecting and/or presenting reviews and/or ratings associated with items are provided. As online shopping and/or purchasing become increasingly prevalent in the market, providing reviews and/or ratings associated with items may be beneficial for users and/or buyers who wish to discern a quality of an item, such as a product and/or a service. For example, a user may determine whether to purchase an item based upon reviews and/or ratings associated with the item. Brands, sellers and/or buyers may stand to benefit from having reviews and/or ratings that are trustworthy, authentic, and/or verified. However, it may prove difficult for shopping platforms to provide principally trustworthy, authentic, and/or verified reviews and/or ratings that are trusted by users. In some cases, reviews and/or ratings of an item are left by users that are not target users and/or target buyers of the item and/or by users that may not be proficient in determining the quality of the item. Thus, the reviews may include inaccurate information and/or the ratings may not be sufficient indicators of the quality of the item. Further, a user and/or a buyer may be offered an item free of charge and/or some other form of compensation in return for submitting a positive review and/or a high rating (5 stars for example) of the item on the shopping platform, review platform, etc. irrespective of the quality of the item. Thus, it may prove difficult for users and/or prospective buyers to determine whether a positive review and/or a high rating actually indicates a high quality item, or rather has been left by a reviewer merely to receive compensation in return for leaving the positive review and/or the high rating.

Reviews and/or ratings collected and/or verified by a third-party source separate from a shopping platform, a seller, a brand, etc., may appear more trustworthy to a user and/or a buyer as compared to reviews and/or ratings collected and/or verified by the shopping platform, the seller, the brand, etc., such as at least due to the third-party source not being directly related to the items being sold, and thus having little to no incentive to provide erroneous and/or non-authentic reviews and/or ratings. Further, reviews and/or ratings provided by reviewers of a target audience of an item may provide more accurate description of the item and/or may provide more accurate indicators of the quality of the item.

Thus, in accordance with one or more of the techniques presented herein, a review system is provided. A brand, a seller, a shopping platform, etc. may request for an item to be reviewed via the review system. The review system may selectively approve reviewers (e.g., users of the review system) to purchase, review, and/or rate the item. A reviewer may be approved to review and/or rate the item based upon a determination that the reviewer is associated with a target audience of the item. This determination may be made based upon a target profile associated with the item, and a reviewer profile associated with the reviewer. An approved reviewer may be provided compensation (such as reimbursement for their purchase of the item) in exchange for the approved reviewer purchasing the item, using the item, reviewing the item and/or rating the item. Accordingly, the review system provides reviews and/or ratings on the review platform that are authentic, accurate, etc. and prospective buyers and/or users can trust the reviews and/or the ratings and thus discern the quality of the item more accurately.

An embodiment for collecting and/or presenting reviews and/or ratings associated with items is illustrated by an example method 100 of FIG. 1. In some examples, a review system is provided. A first entity (and/or a first client device associated with the first entity) may access and/or interact with a review platform interface (such as a website, an application, etc.) associated with the review system. The first entity may use the review platform interface to request that one or more items, associated with the first entity, be reviewed and/or rated. In some examples, the first entity may correspond to at least one of a brand, a company, an organization, a retailer, a shopping platform, a store, etc. In an example, the first entity may correspond to a kitchen appliance retailer and/or the one or more items may correspond to one or more products (e.g., kitchen appliances) and/or one or more services (e.g., kitchen appliance repair, kitchen appliance installation, etc.). For example, an item of the one or more items may correspond to a product and/or a service that is on the market (e.g., currently being publicly provided and/or sold) or not publicly released on the market (e.g., a release date of the product and/or the service may be planned for later).

At 102, the review system may receive a first request to perform a review procedure for a first item associated with the first entity. The first request to perform the review procedure may be received via the first client device associated with the first entity. The first client device may be at least one of a phone, a smartphone, a laptop, a tablet, a computer, etc. In some examples, the first item may correspond to a product and/or a service associated with the first entity (e.g., the product and/or the service may be provided and/or sold by the first entity). The first request to perform the review procedure may be received via the review platform interface (e.g., the first entity associated with the first client device may submit the first request using the review platform interface on the first client device).

In some examples, the review system may receive first item information associated with the first item. For example, the first item information may be received from the first client device (and/or another client device associated with the first entity). In some examples, the first item information may be comprised within the first request to perform the review procedure. Alternatively and/or additionally, the first item information and the first request to perform the review procedure may be received separately. In an example, the first item information may comprise an image of the first item, one or more specifications of the first item, a description of the first item, etc.

In some examples, the review system may receive first target information associated with the first item. For example, the first target information may be received from the first client device (and/or another client device associated with the first entity). In some examples, the first target information may be comprised within the first request to perform the review procedure. Alternatively and/or additionally, the first target information and the first request to perform the review procedure may be received separately.

The first target information may be indicative of information corresponding to a first target audience of the first item, such as characteristics of consumers to which the first item is targeted and/or market (e.g., consumers that are likely to be interested and/or to purchase the first item). In an example, the first target information may be indicative of one or more ages (e.g., an age range) associated with the first target audience of the first item. Alternatively and/or additionally, the first target information may be indicative of one or more locations (e.g., at least one of one or more cities, one or more states, one or more provinces, one or more countries, one or more regions, etc.) associated with the first target audience of the first item. Alternatively and/or additionally, the first target information may be indicative of one or more genders associated with the first target audience of the first item. Alternatively and/or additionally, the first target information may be indicative of an education level associated with the first target audience of the first item. Alternatively and/or additionally, the first target information may be indicative of user activity associated with the first target audience of the first item (e.g., the user activity may correspond to historical activity, such as one or more previously accessed internet resources, articles, videos, etc.). Alternatively and/or additionally, the first target information may be indicative of one or more past purchases associated with the first target audience of the first item (e.g., the one or more past purchases may correspond to historical purchases of products and/or services other than the first item). Alternatively and/or additionally, the first target information may be indicative of one or more cookies (e.g., browser cookies) associated with the first target audience of the first item. Alternatively and/or additionally, the first target information may be indicative of one or more user interests associated with the first target audience of the first item. Alternatively and/or additionally, the first target information may be indicative of one or more income levels associated with the first target audience of the first item (e.g., an income level may correspond to an amount of income received by at least one of a person, a family, a household, etc., per unit of time, such as at least one of per month, per year, etc.). Alternatively and/or additionally, the first target information may be indicative of one or more social status levels associated with the first target audience of the first item. Alternatively and/or additionally, the first target information may be indicative of one or more ethnicities associated with the first target audience of the first item. Alternatively and/or additionally, the first target information may be indicative of one or more shopping habits associated with the first target audience of the first item. Examples of shopping habits include at least one of whether a person has an affinity for purchasing products and/or services that are associated with one or more specific brands and/or one or more specific companies, whether a person uses internet resources to purchase products and/or services, whether a person purchases products and/or services at physical locations (e.g., stores, shopping centers, business locations, etc.), etc. Alternatively and/or additionally, the first target information may be indicative of one or more household characteristics associated with the first target audience of the first item. At least one of a marital status of a person, a family size of a family of a person, a household size of a person, etc. are examples of household characteristics. Alternatively and/or additionally, the first target information may be indicative of one or more occupations associated with the first target audience of the first item. Alternatively and/or additionally, the first target information may be indicative of one or more physical features associated with the first target audience of the first item. At least one of a hair color of a person, a hair length of a person, whether a person is balding, whether a person wears glasses and/or other eye-wear, whether a person has facial hair, a length of facial hair of a person, a height of a person, a weight of a person, a body-mass index of a person, etc. are examples of physical features. Alternatively and/or additionally, the first target information may be indicative of one or more body types associated with the first target audience of the first item. A body type may correspond to at least one of a height range, a weight range, a body-mass index range, etc. In some examples, at least some of the first target information may be received via the review platform interface. For example, the review platform interface may display a target information interface on the first client device and/or another client device associated with the first entity. The target information interface may comprise one or more selectable inputs and/or one or more input text fields. At least some of the first target information may be received via selections of the one or more selectable inputs and/or at least some of the first target information may be received by way of entering data (e.g., text) into the one or more input text fields.

At 104, responsive to receiving the first request (and/or the first item information and/or the first target information), a first target profile associated with the first item may be generated. In some examples, the first target profile may be generated based upon the first target information and/or the first item information. In some examples, the first target profile may be indicative of one or more first characteristics associated with the first target audience, such as at least one of the one or more ages, the one or more locations, the one or more genders, the education level, the user activity, the one or more past purchases, the one or more cookies, the one or more user interests, the one or more income levels, the one or more social status levels, the one or more ethnicities, the one or more shopping habits, the one or more household characteristics, the one or more occupations, the one or more physical features, the one or more body types, etc. In some examples, such as where the first target information associated with the first item is not received from the first entity, the one or more first characteristics associated with the first target audience may be determined based upon the first item information associated with the first item. In an example, a type of item of the first item (e.g., a type of product and/or a type of service, such as "coffee maker") may be determined based upon the first item information, and/or the one or more first characteristics associated with the first target audience may be determined based upon target profiles associated with items that match the type of item of the first item.

In some examples, the first target profile may be indicative of one or more item categories associated with the first item. An item category may correspond to a classification of a group of items, such as a group of products and/or services. At least one of "kitchen appliances", "art supplies", "coffee and espresso", "clothing", "athletic wear", "electronics", "landscaping services", etc. may be examples of item categories. In some examples, the first target profile may be indicative of one or more item category scores associated with the first item and the one or more item categories. A first item category score of the one or more item category scores may be associated with the first item and a first item category of the one or more item categories associated with the first item. In some examples, the first item category score may be associated with a relevance of the first item category to the first item (e.g., the first item category score may be indicative of and/or may reflect the relevance of the first item category to the first item). In an example where the first item is a coffee maker, the first item category corresponds to "kitchen appliances", and/or a second item category of the one or more item categories corresponds to "coffee and espresso", the first item category score associated with the first item category may be lower than a second item category score associated with the second item category at least due to the first item category "kitchen appliances" being less relevant to the coffee maker than the second item category "coffee and espresso" is.

In some examples, the one or more item categories associated with the first item may be determined based upon the first target information, the first item information and/or the first request to perform the review procedure. For example, the first target information, the first item information and/or the first request may be analyzed to identify the one or more item categories in the first target information, the first item information and/or the first request (e.g., the first target information, the first item information and/or the first request may be indicative of the one or more item categories associated with the first item). Alternatively and/or additionally, a plurality of item categories may be analyzed based upon information associated with the first item to identify the one or more item categories that are associated with the first item (e.g., the information may comprise a title of the first item, one or more specifications of the first item, etc. indicated by the first target information, the first item information and/or the first request). Alternatively and/or additionally, the one or more item category scores may be determined based upon the one or more item categories, the first target information, the first item information and/or the first request. In some examples, artificial intelligence and/or one or more machine learning techniques may be used to determine the one or more item category scores. In an example, the first item category score may be determined based upon the first item category, the first target information, the first item information and/or the first request. For example, a relevance of the first item category to the first item may be determined based upon the first item category and/or one or more specifications of the first item (e.g., the one or more specifications may be indicated by the first item information), and/or the first item category score may be generated to reflect the relevance.

Figure 2A:
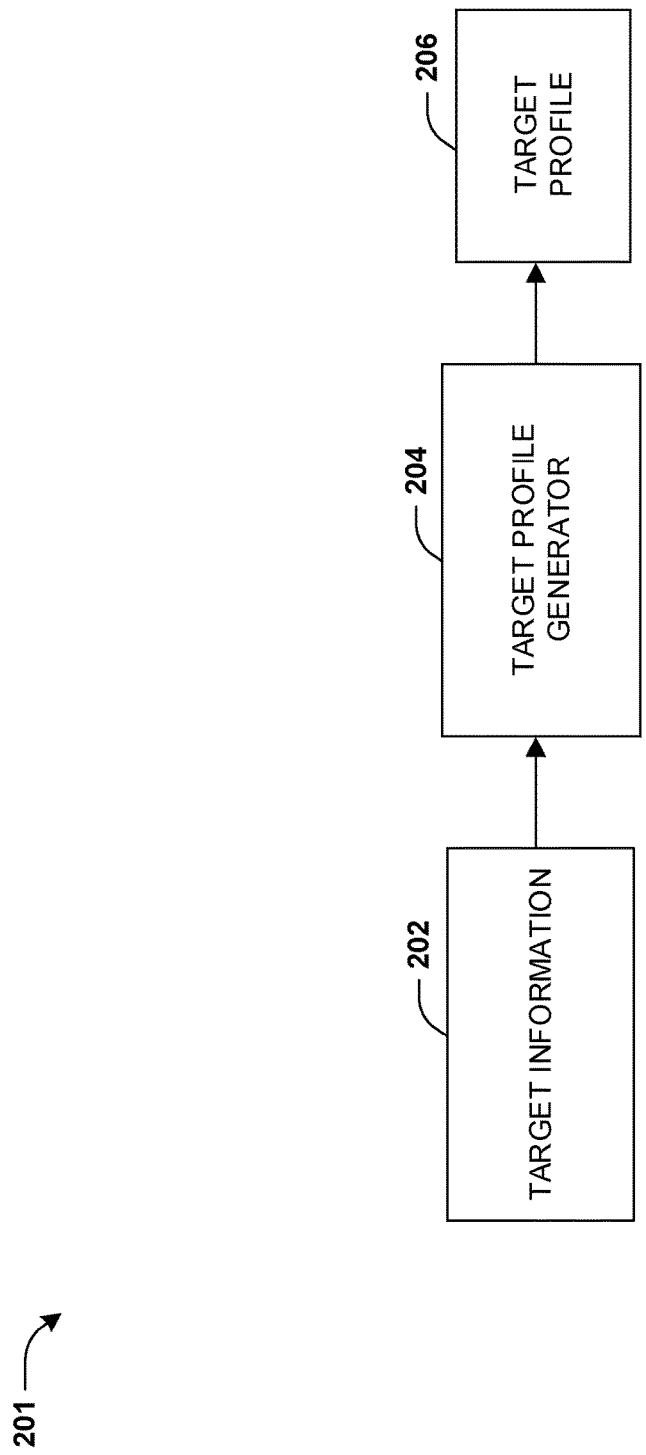
FIG. 2A is a component block diagram illustrating an exemplary system for generating target profiles and/or reviewer profiles, where a target profile is generated.

FIGS. 2A-2D illustrate examples of a system 201 for generating target profiles and/or reviewer profiles, described with respect to the method 100 of FIG. 1. FIG. 2A illustrates generation of the first target profile (shown with reference number 206), according to some exemplary embodiments. The first target information (shown with reference number 202) and/or other information may be input to a target profile generator 204. The target profile generator 204 may generate and/or output the first target profile 206 based upon the first target information 202 and/or the other information.

FIG. 2B illustrates the first target profile 206 according to some exemplary embodiments. In an example of the first target profile 206 illustrated in FIG. 2B, the first item is a coffee maker (with a title "Neller Coffee Maker"). The first target profile 206 may comprise an age range 212 (e.g., ages 19-39) associated with the first target audience, a location 214 (e.g., North America) associated with the first target audience, one or more genders 216 associated with the first target audience, an education level 218 (e.g., high-school educated) associated with the first target audience, user activity 220 (e.g., activity including searches for coffee-related products and/or searches for kitchen appliances) associated with the first target audience, past purchases 222 (e.g., purchases of coffee, coffee filters, kitchen appliances, mugs, etc.) associated with the first target audience, interests 224 associated with the first target audience and/or the one or more item categories along with the one or more item category scores (shown with reference number 226).

At 106, a graphical user interface of a second client device associated with a first reviewer, such as user Nancy, may be controlled to display the review platform interface comprising one or more selectable inputs associated with one or more items. The one or more items may correspond to one or more products and/or one or more services to be reviewed by reviewers associated with the review system. For example, an item of the one or more items (and/or each item of the one or more items) may be associated with an entity (e.g., at least one of a brand, a company, an organization, a retailer, a shopping platform, a store, etc.) from which a request to perform a review procedure associated with the item has been received. In some examples, the first reviewer may be a user of the review system and/or may have a first user account with the review system. For example, the review platform interface may be accessed via the second client device and/or the first reviewer may log in to the first user account, such as by way of entering a username, a password, etc. and/or automatically based upon a determination that the second client device is linked to the first user account. In some examples, the review platform interface may be tailored to the first reviewer when the first reviewer is logged in to the first user account via the second client device. The second client device may be at least one of a phone, a smartphone, a laptop, a tablet, a computer, etc. In some examples, the one or more items may comprise the first item (e.g., a coffee maker). For example, the one or more selectable inputs may comprise at least one of a first selectable input associated with the first item, a second selectable input associated with a second item of the one or more items, etc.

In some examples, first reviewer information associated with the first reviewer may be received. For example, the first reviewer information may be received from the first client device (and/or another client device associated with the first reviewer). In an example, the first reviewer information may be indicative of an age and/or an age range associated with the first reviewer. Alternatively and/or additionally, the first reviewer information may be indicative of a location associated with the first reviewer (e.g., at least one of a city, a state, a province, a country, a region, etc. within which the first reviewer resides). Alternatively and/or additionally, the first reviewer information may be indicative of a gender associated with the first reviewer. Alternatively and/or additionally, the first reviewer information may be indicative of an education level associated with the first reviewer. Alternatively and/or additionally, the first reviewer information may be indicative of user activity associated with the first reviewer (e.g., the user activity may correspond to historical activity, such as one or more internet resources, articles, videos, etc. previously accessed by the second client device). Alternatively and/or additionally, the first reviewer information may be indicative of one or more past purchases associated with the first reviewer. Alternatively and/or additionally, the first reviewer information may be indicative of one or more cookies (e.g., browser cookies) associated with the second client device. Alternatively and/or additionally, the first reviewer information may be indicative of one or more interests associated with the first reviewer. Alternatively and/or additionally, the first reviewer information may be indicative of an income level associated with the first reviewer (e.g., an amount of income received by at least one of the first reviewer, a household of the first reviewer, a family of the first reviewer, etc.). Alternatively and/or additionally, the first reviewer information may be indicative of a social status level associated with the first reviewer. Alternatively and/or additionally, the first reviewer information may be indicative of one or more ethnicities associated with the first reviewer. Alternatively and/or additionally, the first reviewer information may be indicative of one or more shopping habits associated with the first reviewer. Alternatively and/or additionally, the first reviewer information may be indicative of one or more household characteristics associated with the first reviewer (e.g., at least one of a marital status of the first reviewer, a family size of a family of the first reviewer, a household size of the first reviewer, etc.). Alternatively and/or additionally, the first reviewer information may be indicative of an occupation associated with the first reviewer (e.g., at least one of accountant, engineer, student, etc.). Alternatively and/or additionally, the first reviewer information may be indicative of one or more physical features associated with the first reviewer. Alternatively and/or additionally, the first reviewer information may be indicative of a body type associated with the first reviewer. In some examples, at least some of the first reviewer information may be received via the review platform interface on the second client device. For example, the review platform interface may display a reviewer information interface on the second client device and/or another client device associated with the first reviewer. The reviewer information interface may comprise one or more selectable inputs and/or one or more input text fields. At least some of the first reviewer information may be received via selections of the one or more selectable inputs and/or at least some of the first reviewer information may be received by way of entering data (e.g., text) into the one or more input text fields.

In some examples, a first reviewer profile may be generated based upon the first reviewer information. In some examples, the first reviewer profile may be indicative of one or more second characteristics associated with the first reviewer, such as at least one of the age and/or the age range associated with the first reviewer, the location associated with the first reviewer, the education level associated with the first reviewer, the user activity associated with the first reviewer, the one or more past purchases associated with the first reviewer, the one or more cookies associated with the second client device, the one or more interests associated with the first reviewer, the income level associated with the first reviewer, the social status level associated with the first reviewer, the one or more ethnicities associated with the first reviewer, the one or more shopping habits associated with the first reviewer, the one or more household characteristics associated with the first reviewer, the occupation associated with the first reviewer, the one or more physical features associated with the first reviewer, the body type associated with the first reviewer, etc. In some examples, at least some of the one or more second characteristics are determined based upon information other than the first reviewer information. In an example, at least some of the one or more second characteristics may be determined based upon information received from an external system, such as a social media system, a content system, a communication system, a shopping system, etc. with which the first reviewer has a second user account. In an example, the second user account is linked to the first user account associated with the review system. At least one of the age, the age range, the location, the education level, the user activity, the one or more interests, the one or more past purchases etc. associated with the first reviewer may be received from the external system (e.g., the one or more past purchases associated with the first reviewer may be received from the external system in an example where the external system is a shopping system with which the first reviewer performed the one or more past purchases).

In some examples, the first reviewer profile may be indicative of one or more reviewer categories associated with the first reviewer. A reviewer category may correspond to a classification of a group of items, such as a group of products and/or services, that are associated with a reviewer. At least one of "kitchen appliances", "art supplies", "coffee and espresso", "clothing", "athletic wear", "electronics", "landscaping services", etc. may be examples of reviewer categories. In some examples, reviewer categories may be similar to or the same as item categories, but are used for characterizing reviewers. The one or more reviewer categories may be determined based upon the first reviewer information, the one or more second characteristics associated with the first reviewer and/or other information associated with the first reviewer. For example, a plurality of reviewer categories (e.g., the plurality of item categories) may be analyzed based upon the first reviewer information, the one or more second characteristics associated with the first reviewer and/or the other information associated with the first reviewer to identify the one or more reviewer categories associated with the first reviewer. The one or more reviewer categories may be identified based upon a determination that the one or more reviewer categories are related to and/or relevant to the first reviewer.

The one or more reviewer categories may be determined based upon the one or more interests associated with the first reviewer. For example, a reviewer category of the one or more reviewer categories may be identified and/or may be determined to be related to the first reviewer based upon a determination that the reviewer category is associated with (e.g., matches and/or is related to) an interest of the one or more interests. In an example where the one or more interests associated with the first reviewer comprise an interest "cooking", the one or more reviewer categories may comprise at least one of a reviewer category "kitchen appliances", a reviewer category "cooking utensils", a reviewer category "kitchenware", etc. determined to be associated with (e.g., match and/or be related to) the interest "cooking".

The one or more reviewer categories may be determined based upon the one or more previous purchases associated with the first reviewer. For example, a reviewer category of the one or more reviewer categories may be identified and/or may be determined to be related to the first reviewer based upon a determination that the reviewer category is associated with (e.g., matches and/or is related to) a previous purchase of the one or more previous purchases. It may be determined that a previous purchase of the one or more previous purchases is associated with a reviewer category based upon a determination that an item category associated with the previous purchase (e.g., the item category may be associated with a product and/or a service that was purchased) corresponds to the reviewer category. In an example where the one or more previous purchases associated with the first reviewer comprises a purchase of a product "tennis racket", the one or more reviewer categories may comprise at least one of a reviewer category "sports apparel", a reviewer category "tennis equipment", etc. based upon a determination that the product "tennis racket" is associated with one or more corresponding item categories, such as at least one of an item category "sports apparel", an item category "tennis equipment", etc.

In some examples, the first reviewer profile may be indicative of one or more reviewer category scores associated with the first reviewer and the one or more reviewer categories. A first reviewer category score of the one or more reviewer category scores may be associated with the first reviewer and a first reviewer category of the one or more reviewer categories. In some examples, the first reviewer category score may be associated with at least one of an expertise, a proficiency, a competence, an amount of experience, an amount of interest, etc. of the first reviewer with respect to using and/or reviewing items (e.g., products and/or services) that are associated with the first reviewer category (e.g., the first reviewer category score may be indicative of and/or may reflect at least one of the expertise, the proficiency, the competence, the amount of experience, the amount of interest, etc. of the first reviewer). In some examples, artificial intelligence and/or one or more machine learning techniques may be used to determine the one or more reviewer category scores.

In some examples, the first reviewer category score may be determined based upon the one or more interests associated with the first reviewer, such as based upon whether the one or more interests comprise one or more related interests that are related to and/or that encompass the first reviewer category. In a first example, the first reviewer category corresponds to "kitchen appliances" and the one or more interests comprise a related interest (such as an interest "cooking") that is determined to be associated with (e.g., match and/or be related to) the first reviewer category. In a second example, the one or more interests do not comprise any related interest that are determined to be associated with (e.g., match and/or be related to) the first reviewer category. The first reviewer category score may be higher in the first example than in the second example.

In some examples, the first reviewer category score may be determined based upon the one or more previous purchases associated with the first reviewer. For example, an amount of related previous purchases may be determined. The amount of related purchases may correspond to a quantity of one or more related purchases of the one or more previous purchases, where the one or more related purchases correspond to purchases of one or more items (e.g., products and/or services) that are determined to be associated with (e.g., match and/or be related to) the first reviewer category. The first reviewer category score may be determined based upon the amount of related purchases (e.g., the first reviewer category score may be a function of the amount of related purchases and/or one or more other values, where the first reviewer category score may increase with an increase of the amount of related purchases). Alternatively and/or additionally, the first category score may be determined based upon a relevance of the one or more related purchases (e.g., a relevance of the one or more items of the one or more related purchases) to the first reviewer category.

In some examples, the first reviewer profile may be indicative of one or more previous reviews and/or one or more previous ratings, such as reviews and/or ratings that the first reviewer previously made (using the review system, a shopping platform and/or some other platform) for one or more items (e.g., previously purchased products and/or services). The first reviewer category score may be determined based upon the one or more previous reviews and/or the one or more previous ratings. For example, an amount of related reviews and/or an amount of related ratings may be determined. The amount of related reviews may correspond to a quantity of one or more related reviews of the one or more previous reviews, where the one or more related reviews are reviews of one or more items (e.g., products and/or services) that are determined to be associated with (e.g., match and/or be related to) the first reviewer category. The amount of related ratings may correspond to a quantity of one or more related ratings of the one or more previous ratings, where the one or more related ratings are ratings of one or more items (e.g., products and/or services) that are determined to be associated with (e.g., match and/or be related to) the first reviewer category. The first reviewer category score may be determined based upon the amount of related reviews (e.g., the first reviewer category score may be a function of the amount of related reviews and/or one or more other values, where the first reviewer category score may increase with an increase of the amount of related reviews). Alternatively and/or additionally, the first reviewer category score may be determined based upon the amount of related ratings (e.g., the first reviewer category score may be a function of the amount of related ratings and/or one or more other values, where the first reviewer category score may increase with an increase of the amount of related ratings). Alternatively and/or additionally, the first reviewer category score may be determined based upon a relevance of the one or more related reviews (e.g., a relevance of the one or more items associated with the one or more related reviews) to the first reviewer category. Alternatively and/or additionally, the first reviewer category score may be determined based upon a relevance of the one or more related ratings (e.g., a relevance of the one or more items associated with the one or more related ratings) to the first reviewer category.

In some examples, one or more review scores associated with the one or more related reviews may be determined, and/or the first reviewer category score may be determined based upon the one or more review scores. For example, a review score of the one or more review scores may correspond to a quality of a review of the one or more related reviews. In some examples, the review score may be determined based upon a length of the review (e.g., the length may correspond to at least one of a quantity of characters, a quantity of words, etc. of the review). Alternatively and/or additionally, the review score may be determined based upon at least one of an amount of information and/or details of a reviewed item provided in the review, whether the review contains language and/or terms appropriate for describing the reviewed item, whether pros and/or cons of the reviewed item are provided in the review, etc. which may be determined by analyzing the review using one or more language processing techniques, one or more machine learning techniques and/or other techniques. Alternatively and/or additionally, the review score may be determined based upon reactions to the review indicated by other users. For example, the review score may be determined based upon an amount of positive reactions to the review (e.g., likes and/or indications that the review was helpful to one or more users that read the review) and/or an amount of negative reactions to the review (e.g., dislikes and/or indications that the review was unhelpful to one or more users that read the review). For example, the review score may be a function of the amount of positive reactions and/or one or more other values, where the first reviewer category score may increase with an increase of the amount of positive reactions. Alternatively and/or additionally, the review score may be a function of the amount of negative reactions and/or one or more other values, where the first reviewer category score may decrease with an increase of the amount of negative reactions. In some examples, the first reviewer profile is indicative of review scores associated with the one or more previous reviews by the first reviewer.

Figure 2C:
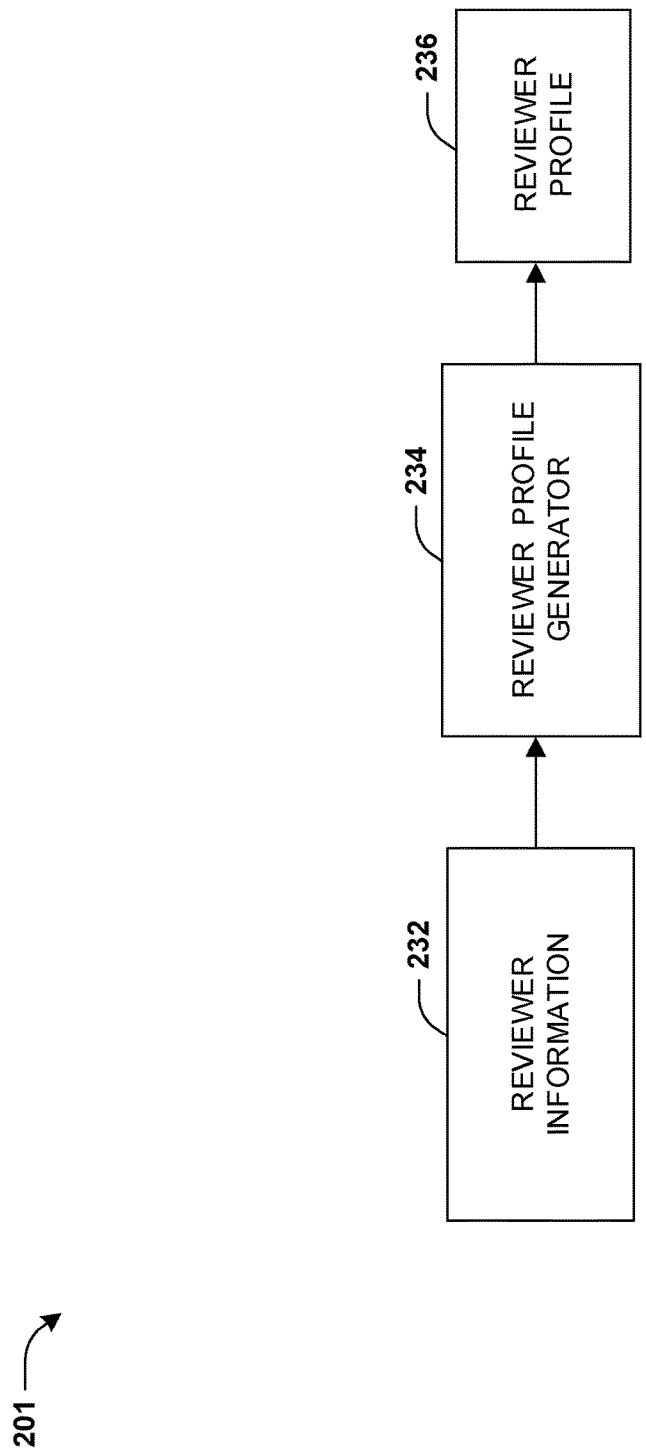
FIG. 2C is a component block diagram illustrating an exemplary system for generating target profiles and/or reviewer profiles, where a reviewer profile is generated.

FIG. 2C illustrates generation of the first reviewer profile (shown with reference number 236), according to some exemplary embodiments. The first reviewer information (shown with reference number 232) and/or other information may be input to a reviewer profile generator 234. The first reviewer profile generator 234 may generate and/or output the first reviewer profile 236 based upon the first reviewer information 232 and/or the other information.

FIG. 2D illustrates the first reviewer profile 236 according to some exemplary embodiments. The first reviewer profile 236 may comprise an age 242 (e.g., 21) associated with the first reviewer, a location 244 (e.g., New York City) associated with the first reviewer, a gender 246 associated with the first reviewer, an education level 248 (e.g., high-school diploma) associated with the first reviewer, user activity 250 (e.g., activity including consuming articles related to coffee, searches for coffee making methods, etc.) associated with the first reviewer, past purchases 252 (e.g., purchases of a mug, a milk foamer, coffee filters, a tennis racket, etc.) associated with the first reviewer, interests 254 associated with the first reviewer and/or the one or more reviewer categories along with the one or more reviewer category scores (shown with reference number 256).

At 108, a first request to review the first item may be received from the second client device via the review platform interface. For example, the first request to review the first item may be received via a selection of the first selectable input associated with the first item.

At 110, it may be determined that the first reviewer is associated with the first target audience of the first item based upon the first target profile and/or the first reviewer profile. In some examples, the first reviewer may be approved to review the first item based upon the determination that the first reviewer is associated with the first target audience and/or based upon other information. In some examples, it may be determined that the first reviewer is associated with the first target audience of the first item based upon the first target profile and/or the first reviewer profile using one or more machine learning techniques and/or other techniques In some examples, the review platform interface may display the first selectable input corresponding to reviewing the first item based upon the determination that the first reviewer is associated with the first target audience and/or that the first reviewer is approved to review the first item. For example, prior to displaying the first selectable input via the review platform interface, the first reviewer profile and/or the first target profile may be analyzed to determine whether the first reviewer is associated with the first target audience and/or whether the first reviewer is approved to review the first item. The first item may be included in a list of approved items associated with the second client device and/or the user account responsive to the determination that the first reviewer is associated with the first target audience and/or that the first reviewer is approved to review the first item. Selectable inputs and/or item information associated with items of the list of approved items may be displayed and/or accessed via the review platform interface on the second client device. In some examples, selectable inputs and/or other information, associated with items for which the first reviewer is not approved to make reviews (e.g., items not included in the list of approved items), may not be displayed via the review platform interface on the second client device. Alternatively and/or additionally, selectable inputs and/or other information, associated with items for which the first reviewer is not approved to make reviews (e.g., items not included in the list of approved items), may be displayed via the review platform interface on the second client device (such as adjacent an indication that the first reviewer is not approved to review the items).

Alternatively and/or additionally, the review platform interface may display the first selectable input associated with the first item prior to determining whether the first reviewer is associated with the first target audience and/or whether the first reviewer is approved to review the first item. In some examples, responsive to receiving the first request to review the first item, the first reviewer profile and/or the first target profile may be analyzed to determine whether the first reviewer is associated with the first target audience and/or whether the first reviewer is approved to review the first item.

In some examples, whether the first reviewer is associated with the first target audience may be determined based upon a determination of whether the one or more second characteristics indicated by the first reviewer profile are similar to the one or more first characteristics indicated by the first target profile. For example, a characteristic similarity score corresponding to a similarity of the one or more second characteristics to the one or more first characteristics may be determined. In some examples, the characteristic similarity score may be determined based upon a quantity of characteristics (such as at least one of age, location, etc.) that are common to both the one or more first characteristics and the one or more second characteristics. It may be determined that the first reviewer is associated with the first target audience and/or that the first reviewer is approved to review the first item based upon a determination that the characteristic similarity score exceeds a threshold characteristic similarity score.

In some examples, it may be determined that the first reviewer is associated with the first target audience and/or that the first reviewer is approved to review the first item based upon a determination that an age of the first reviewer (as indicated by the first reviewer profile) corresponds to an age indicated by the first target profile (e.g., the age of the first reviewer is within the age range indicated by the first target profile). Alternatively and/or additionally, it may be determined that the first reviewer is associated with the first target audience and/or that the first reviewer is approved to review the first item based upon a determination that a location of the first reviewer (as indicated by the first reviewer profile) corresponds to a location indicated by the first target profile (e.g., a city where the first reviewer resides is within a region, a country and/or a state indicated by the first target profile). Alternatively and/or additionally, it may be determined that the first reviewer is associated with the first target audience and/or that the first reviewer is approved to review the first item based upon a determination that an education level of the first reviewer (as indicated by the first reviewer profile) corresponds to an education level indicated by the first target profile (e.g., the first target profile may indicate an education level of at least a high-school diploma and the first reviewer profile may indicate that the first reviewer has a bachelor's degree). Alternatively and/or additionally, it may be determined that the first reviewer is associated with the first target audience and/or that the first reviewer is approved to review the first item based upon a determination that a gender of the first reviewer (as indicated by the first reviewer profile) corresponds to a gender indicated by the first target profile. Alternatively and/or additionally, it may be determined that the first reviewer is associated with the first target audience and/or that the first reviewer is approved to review the first item based upon a determination that user activity of the first reviewer (as indicated by the first reviewer profile) comprises one or more accessed and/or selected internet resources that are also indicated by the first target profile. Alternatively and/or additionally, it may be determined that the first reviewer is associated with the first target audience and/or that the first reviewer is approved to review the first item based upon a determination that the first reviewer profile comprises indications of one or more previous purchases (e.g., one or more purchased products and/or services) that are also indicated by the first target profile. Alternatively and/or additionally, it may be determined that the first reviewer is associated with the first target audience and/or that the first reviewer is approved to review the first item based upon a determination that the first reviewer profile comprises indications of one or more interests that are also indicated by the first target profile.

In some examples, whether the first reviewer is associated with the first target audience may be determined based upon the one or more item categories, the one or more item category scores, the one or more reviewer categories and/or the one or more reviewer category scores. In some examples, the one or more item categories, the one or more item category scores, the one or more reviewer categories and/or the one or more reviewer category scores may be analyzed using one or more machine learning techniques and/or other techniques to determine whether the first reviewer is associated with the first target audience.

In some examples, it may be determined that the first reviewer is associated with the first target audience and/or that the first reviewer is approved to review the first item based upon an identification of one or more matching categories that are comprised in both the one or more item categories and the one or more reviewer categories. In an example where both the one or more item categories and the one or more reviewer categories comprise a category "kitchen appliances", the one or more matching categories may comprise the category "kitchen appliances".

In some examples, it may be determined that the first reviewer is associated with the first target audience and/or that the first reviewer is approved to review the first item based upon a determination that a quantity of the one or more matching categories exceeds a threshold quantity. Alternatively and/or additionally, it may be determined that the first reviewer is associated with the first target audience and/or that the first reviewer is approved to review the first item based upon a determination that the one or more matching categories correspond to at least a first threshold proportion of the one or more reviewer categories. For example, the one or more matching categories make up a first proportion of the one or more reviewer categories that is greater than or equal to the first threshold proportion. Alternatively and/or additionally, it may be determined that the first reviewer is associated with the first target audience and/or that the first reviewer is approved to review the first item based upon a determination that the one or more matching categories correspond to at least a second threshold proportion of the one or more item categories. For example, the one or more matching categories make up a second proportion of the one or more item categories that is greater than or equal to the second threshold proportion (which may be the same as or different than the first threshold proportion).

In some examples, the one or more item category scores may comprise one or more first item category scores associated with the one or more matching categories and the first item. The one or more reviewer category scores may comprise one or more first reviewer category scores associated with the one or more matching categories and the first reviewer. Whether the first reviewer is associated with the first target audience may be determined based upon the one or more first item category scores and/or the one or more first reviewer category scores. In some examples, a category similarity score may be determined. The category similarity score may correspond to a similarity of at least one of the one or more item categories or the one or more item category scores to at least one of the one or more reviewer categories or the one or more reviewer category scores. In some examples, the category similarity score may be determined based upon the quantity of the one or more matching categories, the first proportion, the second proportion and/or one or more other values. In some examples, one or more differences between the one or more first item category scores and the one or more first reviewer category scores may be determined. A first difference of the one or more differences is determined based upon an item category score, of the one or more first item category scores, that is associated with a category of the one or more matching categories, and/or a reviewer category score, of the one or more first reviewer category scores, associated with the category (e.g., the difference may correspond to a difference between the item category score and the reviewer category score). In some examples, one or more operations (e.g., mathematical operations) may be performed using the quantity of the one or more matching categories, the first proportion, the second proportion, the one or more differences, and/or one or more other values to determine the category similarity score. It may be determined that the first reviewer is associated with the first target audience and/or that the first reviewer is approved to review the first item based upon a determination that the category similarity score exceeds a threshold category similarity score.

In some examples, a reviewer suitability score may be determined using one or more machine learning techniques and/or other techniques. The reviewer suitability score may correspond to a similarity of the first reviewer to the first target audience and/or a suitability of the first reviewer for reviewing the first item. The reviewer suitability score may be indicative of and/or may reflect a usefulness, a value and/or a worth that a review by the first reviewer could have for readers of the review (such as by at least one of providing useful opinions and/or facts, providing accurate information, etc.). The reviewer suitability score may be determined based upon the first target profile and/or the first reviewer profile. For example, the reviewer suitability score may be determined based upon at least one of the one or more first characteristics indicated by the first target profile, the one or more second characteristics indicated by the second target profile, the characteristic similarity score, the one or more item categories associated with the first item, the one or more reviewer categories associated with the first reviewer, the one or more matching categories, the quantity of the one or more matching categories, the first proportion, the second proportion, the one or more first reviewer category scores, the one or more first item category scores, the one or more differences, the category similarity score, the review scores associated with the one or more previous reviews by the first reviewer, etc. It may be determined that the first reviewer is associated with the first target audience and/or that the first reviewer is approved to review the first item based upon a determination that the reviewer suitability score exceeds a threshold reviewer suitability score.

In some examples, responsive to determining that the first reviewer is associated with the first target audience and/or that the first reviewer is approved to review the first item, the first item may be assigned for review to the first reviewer. In some examples, an indication that the first item is assigned for review to the first reviewer may be stored in a logbook associated with the first item. The logbook may be stored in a logbook database comprising a plurality of logbooks associated with a plurality of items (e.g., products and/or services) to be reviewed via the review system. The logbook may comprise at least one of one or more user identifiers (e.g., a user identifier may comprise at least one of a username of a user account, a name of a reviewer, etc.) associated with one or more reviewers (comprising the first reviewer) to which the first item is assigned for review. Alternatively and/or additionally, the logbook may comprise one or more locations (e.g., a location may comprise at least one of a city, state or other region) associated with the one or more reviewers to which the first item is assigned for review. Alternatively and/or additionally, the logbook may comprise one or more total costs associated with purchasing the first item by the one or more reviewers to which the first item is assigned for review (e.g., a total cost of the one or more total costs may correspond to a cost for a reviewer to purchase the first item, such as including at least one of a cost of the first item, shipping and handling costs, etc.).

In some examples, the first reviewer may not be approved to review the first item based upon a determination that the first item is already assigned for review to a plurality of reviewers, and/or that a quantity of the plurality of reviewers meets or exceeds a desired quantity of reviewers to review the first item. The desired quantity of reviewers may be determined based upon information received from a device associated with the first entity (such as information comprised in the first request to perform the review procedure). In some examples, a reserve indication, indicating that the first reviewer is a reserve reviewer, may be stored (such as in the logbook) based upon a determination that the quantity of the plurality of reviewers meets or exceeds the desired quantity of reviewers, but that a quantity of a plurality of reserve reviewers for which reserve indications are stored does not meet or exceed a desired quantity of reserve reviewers. In some examples, the desired quantity of reserve reviewers may be less than the desired quantity of reviewers. In an example, the desired quantity of reviewers may be 30 and/or the desired quantity of reserve reviewers may be 5. Alternatively and/or additionally, the desired quantity of reviewers may be 10 and/or the desired quantity of reserve reviewers may be 3. Alternatively and/or additionally, the desired quantity of reviewers may be 7 and/or the desired quantity of reserve reviewers may be 0. Other values of the desired quantity of reviewers and/or the desired quantity of reserve reviewers are within the scope of the present disclosure. In some examples, if the quantity of the plurality of reviewers (to which the first item is assigned for review) decreases to less than the desired quantity of reviewers (such as due to a reviewer not submitting a review of the first item within an allotted time window), the first item may be assigned for review to one or more reserve reviewers of the plurality of reserve reviewers such that the quantity of the plurality of reviewers (to which the first item is assigned for review) increases to meet the desired quantity of reviewers. In some examples, the first item may be assigned for review to reserve reviewers of the plurality of reserve reviewers on a first come, first served basis (e.g., a reserve reviewer that submitted a request to review the first item at a first time may be assigned to review the first item before a different reserve reviewer if the first time is before a second time that the different reserve reviewer submitted a request to review the first item). In some examples, responsive to assigning the first item for review to a reserve reviewer of the plurality of reserve reviewers (and/or responsive to adding the reserve reviewer to the plurality of reviewers to which the first item is assigned for review), a notification that the first item is assigned for review to the reserve reviewer may be transmitted to a client device associated with the reserve reviewer (e.g., the notification may be transmitted via at least one of email, text message, or a dashboard notification on the review platform interface on the client device). In some examples, the notification may comprise review instructions (such as described below).

In some examples, the first reviewer may not be approved to review the first item based upon a determination that the first item is already assigned for review to a plurality of reviewers associated with the same location as the first reviewer (e.g., such as a city, state and/or other region where the first reviewer resides), and that a quantity of the plurality of reviewers meets or exceeds a threshold quantity. In some examples, the threshold quantity may correspond to a maximum quantity of reviewers, from a single location (e.g., a city, state, and/or other region), to which the first item may be assigned for review. Alternatively and/or additionally, the maximum quantity of reviewers from a single location may correspond to a proportion (e.g., at least one of 10%, 20%, 30%, etc.) of the desired quantity of reviewers. In an example where the desired quantity of reviewers corresponds to 100 reviewers and the proportion corresponds to 10%, the maximum quantity of reviewers from a single location may correspond to 10 reviewers.

In some examples, the first reviewer may not be approved to review the first item based upon a determination that the first item is already assigned for review to a plurality of reviewers associated with one or more same characteristics (e.g., at least one of age, age range, gender, education level, user activity, past purchase, interest, reviewer category, etc.) as the first reviewer, and that a quantity of the plurality of reviewers meets or exceeds a threshold quantity. In some examples, the threshold quantity may correspond to a maximum quantity of reviewers, having the one or more same characteristics, to which the first item may be assigned for review. Alternatively and/or additionally, the maximum quantity of reviewers having the one or more same characteristics may correspond to a proportion (e.g., at least one of 10%, 20%, 30%, etc.) of the desired quantity of reviewers.

In some examples, the first reviewer may not be approved to review the first item based upon a determination that the first item is already assigned for review to a different reviewer, and that the different reviewer at least one of is from a same household as the first reviewer, has family ties to the first reviewer, has a client device with an Internet Protocol (IP) address that is the same or similar to an IP address of the second client device, has a shopping account with a shopping platform that is shared with the first reviewer, uses a payment account, a banking account and/or a credit card that is shared with the first reviewer, etc.

In some examples, the first reviewer may not be approved to review the first item based upon a determination that the first item is already assigned for review to a different reviewer, and that the different reviewer is at least one of an invitee or an inviter associated with the first reviewer. The different reviewer may be an invitee when the different reviewer has been invited to make a user account with the review system by the first reviewer (such as by sending an invite message to a client device of the different reviewer using the review platform interface). The different reviewer may be an inviter when the first reviewer has been invited by the different reviewer to make a user account with the review system.

In some examples, the first reviewer may be required to be within a specific region associated with the first item and/or within a threshold distance from a specific location associated with the first item in order to be approved to review the first item. In an example, the first item may correspond to a meal at a restaurant, or other type of product and/or service, and it may be required that reviewers of the first item reside in the same city (or other region) as the specific location where the first item is sold (e.g., such as the restaurant). In some examples, the first reviewer may not be approved to review the first item based upon a determination that a location where the first reviewer resides is at least one of not within the specific region and/or not within the threshold distance from the specific location.

In some examples, the first reviewer may not be approved to review the first item based upon a determination that the first reviewer is flagged and/or banned (such as described below).

At 112, the review system may transmit review instructions, associated with reviewing the first item, to the second client device. In some examples (such as in examples where the review system does not determine whether the first reviewer is associated with the first target audience of the first item and/or whether the first reviewer is approved to review the first item prior to receiving the first request to review the first item), the review instructions may be transmitted to the second client device responsive to determining that the first reviewer is associated with the first target audience of the first item and/or responsive to determining that the first reviewer is approved to review the first item. In some examples, the review instructions are indicative of purchasing the first item, using the first item, submitting a review of the first item and/or submitting a rating of the first item.

In some examples, the review instructions may comprise a first set of information associated with purchasing the first item. In some examples, the first set of information may comprise a link to a web page (e.g., a web address of the web page) associated with purchasing the first item. For example, the web page may correspond to a page of a shopping platform (e.g., a shopping application and/or a shopping website) where the first item can be purchased. Alternatively and/or additionally, the first set of information may comprise a title of the first item that the first reviewer may use to search for and/or purchase the first item. Alternatively and/or additionally, in an example where the first item is a product and/or a service that can be purchased over the phone, the first set of information may comprise an indication of a phone number that can be used to purchase the first item. Alternatively and/or additionally, in an example where the first item is a product and/or a service that can be purchased at a property (e.g., a store, a restaurant, a factory, a clinic, etc.), the first set of information may comprise at least one of an address of the property, one or more coordinates of the property (e.g., a geolocation of the site), directions to the property from a location of the first reviewer, etc. In an example, the first item may correspond to a meal (such as a certain type of prepared food) that is provided by a restaurant. The first set of information may comprise at least one of an address of the restaurant, one or more coordinates of the restaurant, directions to the restaurant from the location of the first reviewer, etc. Alternatively and/or additionally, the first set of information may be indicative of a first time window (e.g., at least one of 12 hours, 2 days, 1 week, etc.) within which the first reviewer is instructed to complete a purchase of the first item. In some examples, an indication of the first time window may be stored in the logbook associated with the first item.

In some examples, the review instructions may comprise a second set of information associated with using the first item. For example, the second set of information may be indicative of an amount that the first item should be used prior to making a review and/or a rating. For example, the amount that the first item should be used may correspond to at least one of a duration of time that the first item should be used, a quantity of times that the first item is used (e.g., in an example where the first item is a coffee maker, the amount that the first item should be used may correspond to using the coffee maker to make coffee 10 times), etc.

In some examples, the review instructions may comprise a third set of information associated with drafting and/or submitting a review of the first item. For example, the third set of information may be indicative of guidelines and/or requirements for drafting a review of the first item, such as at least one of a minimum word count (and/or a minimum character count) of the review, a maximum word count (and/or a maximum character count) of the review, one or more types of information to include in the review, one or more types of information not to include in the review, etc. Alternatively and/or additionally, the third set of information may comprise an indication that the review of the first item is to be based upon and/or reflective of an experience of the first reviewer using the first item. Alternatively and/or additionally, the third set of information may comprise an indication that the review of the first item is to be descriptive of the first item (e.g., descriptive of one or more aspects of the first item, such as at least one of one or more physical and/or visual aspects of the first item, an ease of use of the first item, issues and/or problems with usage of the first item, etc.). Alternatively and/or additionally, the third set of information may comprise an indication that the review of the first item is to be unbiased (e.g., that the review of the first item should not be based upon one or more aspects of the first item that are not demonstrative of a quality of the first item, such as a company that manufactured the first item, a brand of the first item, a country of origin of the first item, etc.). Alternatively and/or additionally, the third set of information may comprise a link to a web page (e.g., a web address of the web page) associated with submitting a review. Alternatively and/or additionally, the third set of information may comprise multiple links to multiple web pages associated with submitting a review of the first item. In some examples, the third set of information may comprise an indication to submit the same review via each web page of the multiple web pages (e.g., the multiple web pages may be associated with multiple platforms). In some examples, the multiple links may comprise a link to a web page of the review platform interface (such as the second web page 318 illustrated in FIG. 3B) and/or a link to a web page of a shopping platform (e.g., the web page of the shopping platform may correspond to a review page of the shopping platform for accessing and/or submitting reviews and/or ratings associated with the first item). In some examples, the third set of information may comprise an indication to submit the same review via the web page of the review platform interface and the web page of the shopping platform. In an example, the third set of information may comprise an indication to submit a review of the first item via the shopping platform (such as via the review page), then to copy the review and/or paste the review into a text field of the review platform interface to submit the review via the review platform interface. Alternatively and/or additionally, the third set of information may be indicative of a second time window (e.g., at least one of 2 days, 1 week, 2 weeks etc.) within which the first reviewer is instructed to submit a review of the first item. In some examples, an indication of the second time window may be stored in the logbook associated with the first item.

In some examples, the second time window may begin responsive to the first reviewer completing the purchase of the first item. Alternatively and/or additionally, the second time window may begin responsive to a purchase receipt and/or purchase confirmation being received from at least one of the second client device or a shopping system with which the first item is purchased. In an example, the first reviewer may have a user account with the shopping system (e.g., an online shopping system) that is linked to the first user account with the review system. The shopping system may transmit the purchase receipt and/or the purchase confirmation to the review system responsive to completion of the purchase. Alternatively and/or additionally, the second time window may begin responsive to the first item being delivered to an address associated with the first reviewer. Alternatively and/or additionally, the second time window may begin when the first time window ends. Alternatively and/or additionally, the second time window may begin when a duration of time passes after the first time window ends (e.g., at least one of 2 days, 5 days, 1 week, etc. after the first time window ends).

In some examples, the first time window (within which to purchase the first item) is shorter than the second time window (within which to submit a review of the first item). In an example, the first time window may be 2 days and/or the second time window may be 3 days. Other durations of the first time window and/or the second time window are within the scope of the present disclosure. Embodiments are contemplated where the first time window is longer than the second time window.

In some examples, the review instructions may comprise a fourth set of information associated with rating of the first item. For example, the fourth set of information may be indicative of guidelines and/or requirements for rating the first item, such as one or more criteria to take into account when rating the first item. Alternatively and/or additionally, the fourth set of information may comprise an indication that the first item is to be rated based upon an experience of the first reviewer using the first item. Alternatively and/or additionally, the fourth set of information may comprise an indication that the rating of the first item is to be unbiased (e.g., that the rating of the first item should not be based upon one or more aspects of the first item that are not demonstrative of a quality of the first item, such as a company that manufactured the first item, a brand of the first item, a country of origin of the first item, etc.). Alternatively and/or additionally, the fourth set of information may comprise a link to a web page (e.g., a web address of the web page) associated with submitting a rating. Alternatively and/or additionally, the fourth set of information may comprise multiple links to multiple web pages associated with submitting a rating of the first item. In some examples, the fourth set of information may comprise an indication to submit the same rating via each web page of the multiple web pages (e.g., the multiple web pages may be associated with multiple platforms). In some examples, the multiple links may comprise a link to a web page of the review platform interface (such as the third web page 328 illustrated in FIG. 3C) and/or a link to a web page of a shopping platform (e.g., the web page of the shopping platform may correspond to a review page of the shopping platform for accessing and/or submitting reviews and/or ratings associated with the first item). In some examples, the fourth set of information may comprise an indication to submit the same rating via the web page of the review platform interface and the web page of the shopping platform. In an example, the fourth set of information may comprise an indication to submit a rating of the first item via the shopping platform (such as via the review page), then to copy the rating and/or paste the rating into a field of the review platform interface to submit the rating via the review platform interface. Alternatively and/or additionally, the fourth set of information may be indicative of a third time window (e.g., at least one of 2 days, 1 week, 2 weeks etc.) within which the first reviewer is instructed to submit a rating of the first item. In some examples, the third time window is the same as the second time window and/or the third time window begins at the same time as the second time window. In some examples, an indication of the third time window may be stored in the logbook associated with the first item.

In some examples, the indication that the first item is assigned for review to the first reviewer may be removed from the logbook responsive to the first reviewer at least one of not purchasing the first item within the first time window, not submitting a review of the first item within the second time window, or not submitting a rating of the first item within the third time window. In some examples, the first reviewer may not be reimbursed for purchasing the first item responsive to the first reviewer at least one of not submitting a review of the first item within the second time window or not submitting a rating of the first item within the third time window.

Figure 3A:
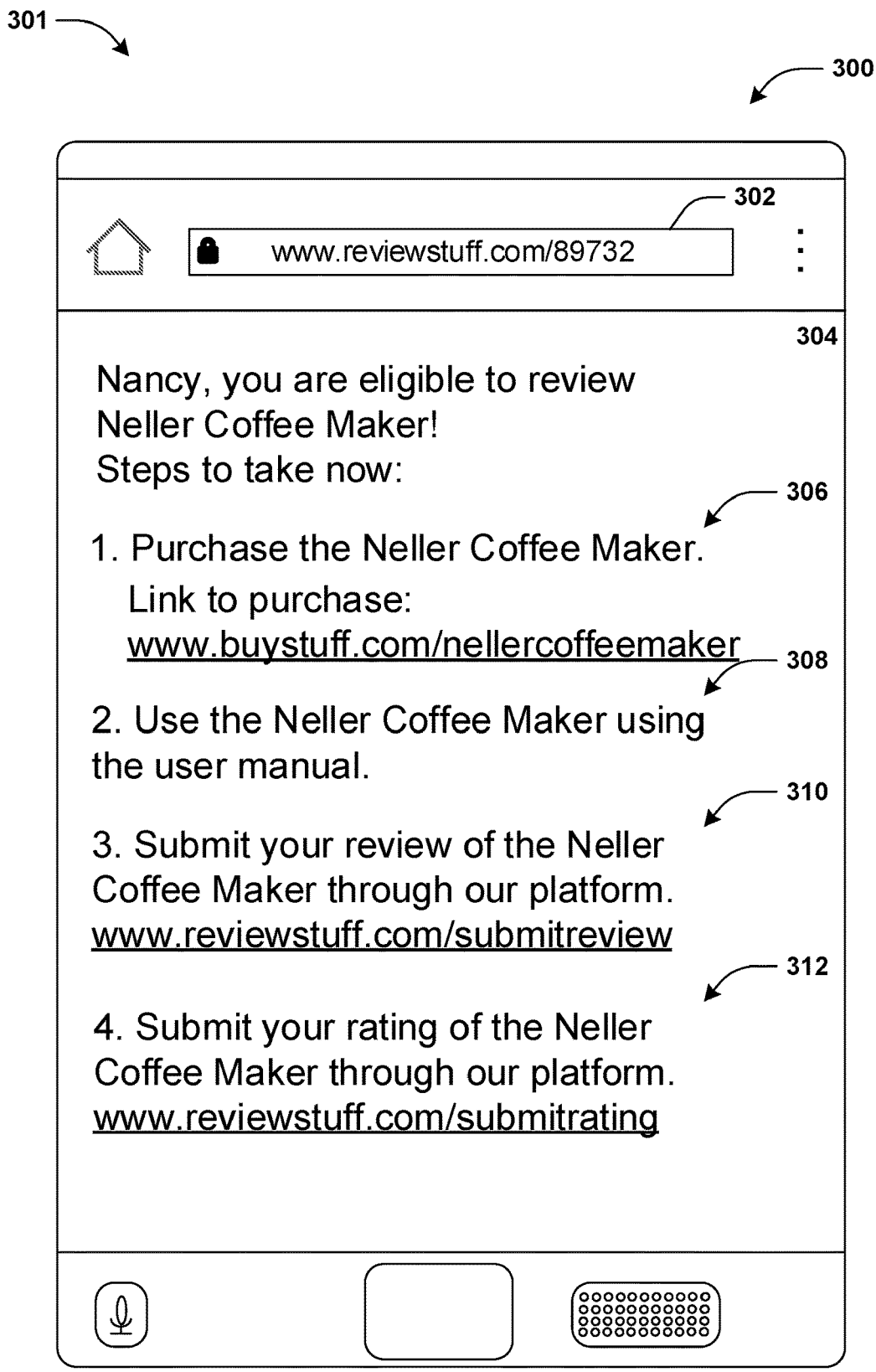
FIG. 3A is a component block diagram illustrating an exemplary system for collecting reviews and/or ratings associated with items, where a client device presents and/or accesses a web page of a review platform interface comprising review instructions.

FIGS. 3A-3D illustrate examples of a system 301 for collecting reviews and/or ratings associated with items, described with respect to the example method 100 of FIG. 1. The first reviewer and/or the second client device (shown with reference number 300 in FIGS. 3A-3D), may access and/or interact with the review platform interface. FIG. 3A illustrates the second client device 300 presenting and/or accessing a first web page 304 of the review platform interface using a browser of the second client device 300. The browser may comprise an address bar 302 comprising a web address (e.g., a Uniform Resource Locator (URL)) of the first web page 304. The first web page 304 may comprise the review instructions associated with the first reviewer submitting a review and/or a rating of the first item. In some examples, the review instructions and/or the first web page 304 may be displayed responsive to determining that the first reviewer is associated with the first target audience and/or responsive to the first item being assigned for review to the first reviewer.

In some examples, the review instructions displayed on the first web page 304 may comprise a first instruction 306 corresponding to purchasing the first item. The first instruction 306 may comprise a link to a web page associated with purchasing the first item. Alternatively and/or additionally, the review instructions displayed on the first web page 304 may comprise a second instruction 308 corresponding to using the first item. The second instruction 308 may indicate that the first item be used according to specific instructions, such as per a user manual. Alternatively and/or additionally, the review instructions displayed on the first web page 304 may comprise a third instruction 310 corresponding to submitting a review of the first item. The third instruction 310 may comprise a link to a second web page 318 (shown in FIG. 3B) associated with submitting a review of the first item. The third instruction 310 may include guidelines and/or requirements corresponding to writing a review of the first item. Alternatively and/or additionally, the first web page 304 may display a fourth instruction 312 corresponding to submitting a rating of the first item. The fourth instruction may 312 may comprise a link to a third web page 328 (shown in FIG. 3C) associated with submitting a rating of the first item. The fourth instruction 312 may include guidelines and/or requirements corresponding to submitting the rating of the first item. One or more instructions of the review instructions may be removed from the first web page 304 responsive to determining that the one or more instructions have been completed by the first reviewer (e.g., the first instruction 306 may be removed from the first web page 304 responsive to the first item being purchased).

Figure 3B:
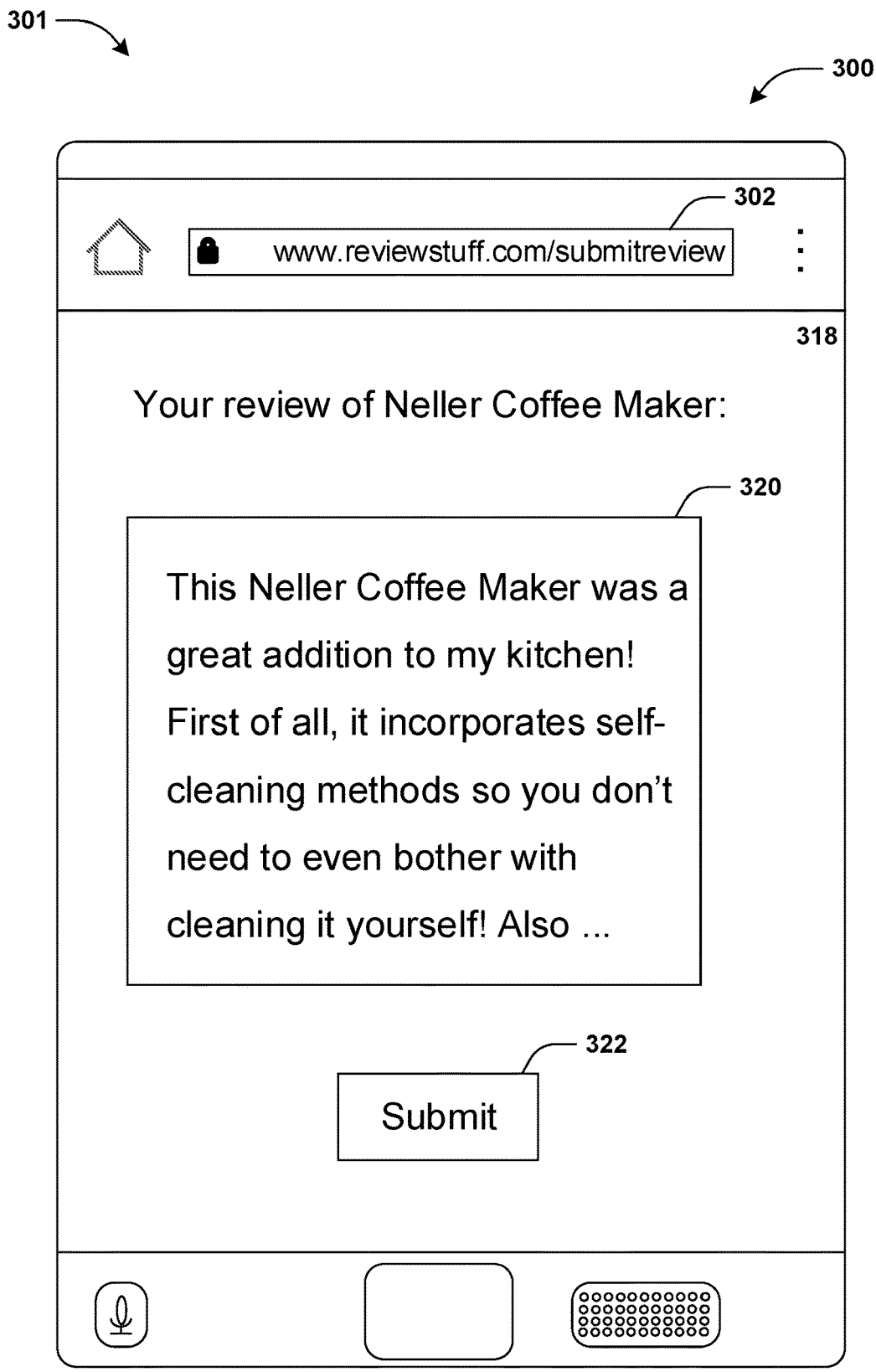
FIG. 3B is a component block diagram illustrating an exemplary system for collecting reviews and/or ratings associated with items, where a client device presents and/or accesses a web page of a review platform interface associated with submitting a review.

FIG. 3B illustrates the second client device 300 presenting and/or accessing the second web page 318 of the review platform interface using the browser of the second client device 300. The second web page 318 may be displayed responsive to a selection of the link (shown in FIG. 3A) to the second web page 318. The second web page 318 may comprise an input text field 320 associated with entering text corresponding to the review. The second web page 318 may comprise a selectable input 322 (e.g., a submit button) associated with submitting, to the review system, text entered into the input text field 320. In some examples, the second web page 318 (and/or the input text field 320 and/or the selectable input 322) may be accessible to the second client device 300 (and/or to the first user account associated with the first reviewer) responsive to at least one of a determination that the first reviewer has purchased the first item, a determination that the first item has been delivered to the first reviewer, a determination that the second time window has begun, or a determination that the second time window has not ended. In some examples, a first review 408 (shown in FIG. 4A), of the first item, by the first reviewer may be received by the review system. For example, the first review 408 may be submitted via the review platform interface, such as using the input text field 320 and/or the selectable input 322. Alternatively and/or additionally, the first review 408 may comprise at least one of one or more images, one or more videos, one or more audio files, etc. that may be submitted via the review platform interface. For example, the second web page 318 may comprise a selectable input (not shown) for submitting at least one of the one or more images, the one or more videos, the one or more audio files, etc. of the first review 408.

Figure 3C:
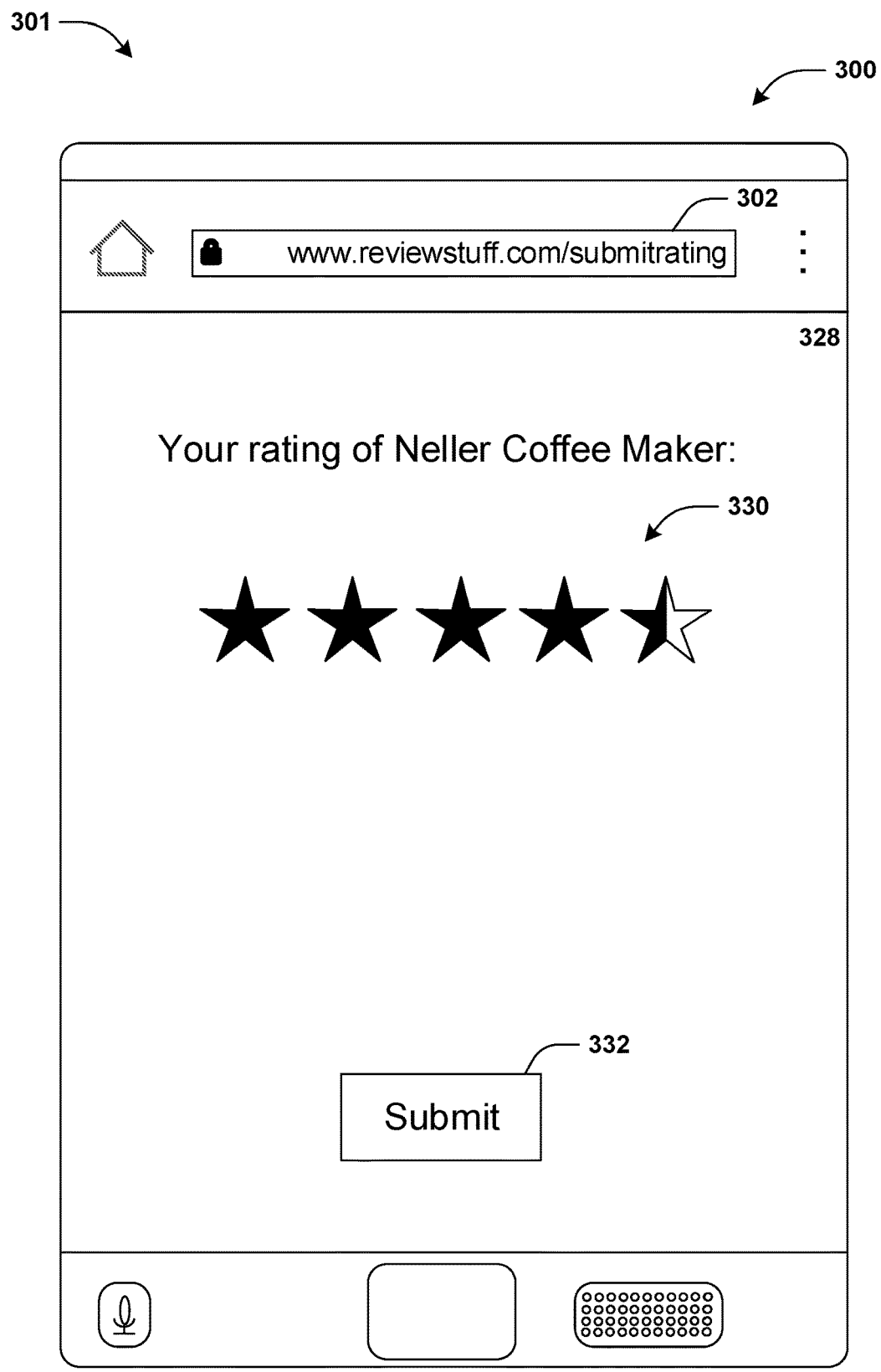
FIG. 3C is a component block diagram illustrating an exemplary system for collecting reviews and/or ratings associated with items, where a client device presents and/or accesses a web page of a review platform interface associated with submitting a rating.

FIG. 3C illustrates the second client device 300 presenting and/or accessing the third web page 328 of the review platform interface using the browser of the second client device 300. The third web page 328 may be associated with submitting a rating of the first item. The third web page 328 may be displayed responsive to a selection of the link (shown in FIG. 3A) to the third web page 328. The third web page 328 may comprise a graphical control element 330 (e.g., five stars) intended to enable the first reviewer to input a rating. The third web page 328 may comprise a selectable input 332 (e.g., a submit button) associated with submitting, to the review system, a rating that is input via the graphical control element 330. In some examples, a first rating (e.g., 4.5 out of 5), of the first item, by the first reviewer may be received by the review system. For example, the first rating may be submitted via the review platform interface, such as using the graphical control element 330 and/or the selectable input 332.

Figure 3D:
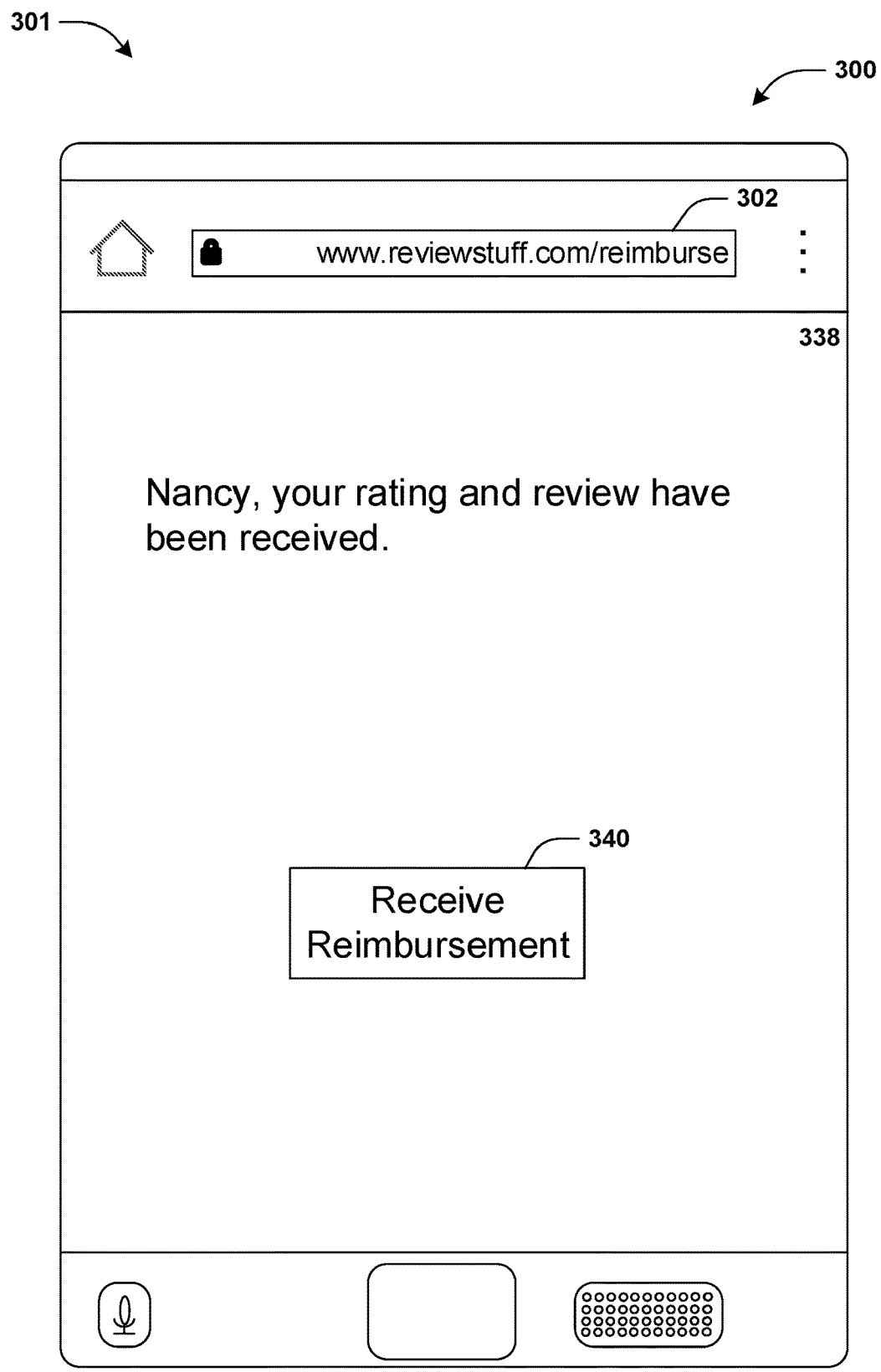
FIG. 3D is a component block diagram illustrating an exemplary system for collecting reviews and/or ratings associated with items, where a client device presents and/or accesses a web page of a review platform interface associated with reimbursement.

FIG. 3D illustrates the second client device 300 presenting and/or accessing a fourth web page 338 of the review platform interface using the browser of the second client device 300. The fourth web page 338 may be associated with reimbursing the first reviewer. The fourth web page 338 may comprise a selectable input 340 (e.g., a receive reimbursement button) associated with receiving reimbursement for the first item. In some examples, the fourth web page 338 (and/or the selectable input 340) may be accessible to the second client device 300 (and/or to the first user account associated with the first reviewer) responsive to a determination that the first review 408 and/or the first rating are received by the review system. Alternatively and/or additionally, the fourth web page 338 (and/or the selectable input 340) may be accessible to the second client device 300 (and/or to the first user account associated with the first reviewer) responsive to a determination that the first review 408 and/or the first rating are approved by the review system. Alternatively and/or additionally, a notification, comprising a link to the fourth web page 338, may be transmitted to the second client device 300 responsive to a determination that the first review 408 and/or the first rating are approved by the review system. For example, the first review 408 and/or the first rating may be analyzed to determine whether the first review 408 and/or the first rating are approved. In some examples, the first review 408 may not be approved responsive to a determination that at least one of a word count of the first review 408 is less than the minimum word count (and/or a character count of the first review 408 is less than the minimum character count), the word count of the first review 408 exceeds the maximum word count (and/or the character count of the first review 408 exceeds the maximum character count), or the first review 408 includes offensive language. In some examples, rather than displaying the fourth web page 338, the review system may reimburse the first reviewer responsive to responsive to a determination that the first review 408 and/or the first rating are received by the review system. Alternatively and/or additionally, the review system may reimburse the first reviewer responsive to responsive to a determination that the first review 408 and/or the first rating are approved.

The reimbursement of the first item may correspond to a total cost spent by the first reviewer to purchase the first item. Alternatively and/or additionally, the reimbursement of the first item may correspond to proportion of the total cost spent by the first reviewer to purchase the first item. The total cost may be determined based upon a proof of purchase (e.g., the purchase receipt and/or the purchase confirmation) received by the review system from at least one of the second client device 300, a shopping platform with which the first item was purchased by the first reviewer, a business from which the first item was purchased by the first reviewer, etc. Alternatively and/or additionally, the total cost may be determined based upon a price of the first item that is displayed via the shopping platform with which the first item was purchased by the first reviewer. The reimbursement may correspond to a monetary currency that the first item was purchased with. In some examples where the proof of purchase is received from the second client device, the review platform interface may display one or more selectable inputs associated with submitting the proof of purchase to the review system.

In some examples, a reimbursement method may be selected by the second client device 300 and/or the first reviewer. The review platform interface may display a list of reimbursement methods from which the reimbursement method may be selected by the second client device 300 and/or the first reviewer. In some examples, the reimbursement may be delivered by depositing an amount of compensation, corresponding to the reimbursement, to a checking account of the first reviewer. Alternatively and/or additionally, the reimbursement may be delivered by printing a check and/or delivering the check by mail to a postal address of the first reviewer. In some examples, the review platform interface may display a text box with which the first reviewer and/or the second client device 300 can enter an account number corresponding to the checking account of the first reviewer and/or submit the account number to the review system. In some examples, the review platform interface may display a text box with which the first reviewer and/or the second client device 300 can enter the postal address of the first reviewer and/or submit the postal address to the review system. In some examples, a link to the fourth web page 338 may be transmitted to the second client device 300 responsive to responsive to a determination that the first review 408 and/or the first rating are received by the review system. Alternatively and/or additionally, the link to the fourth web page 338 may be transmitted to the second client device 300 responsive to responsive to a determination that the first review 408 and/or the first rating are approved.

Figure 4A:
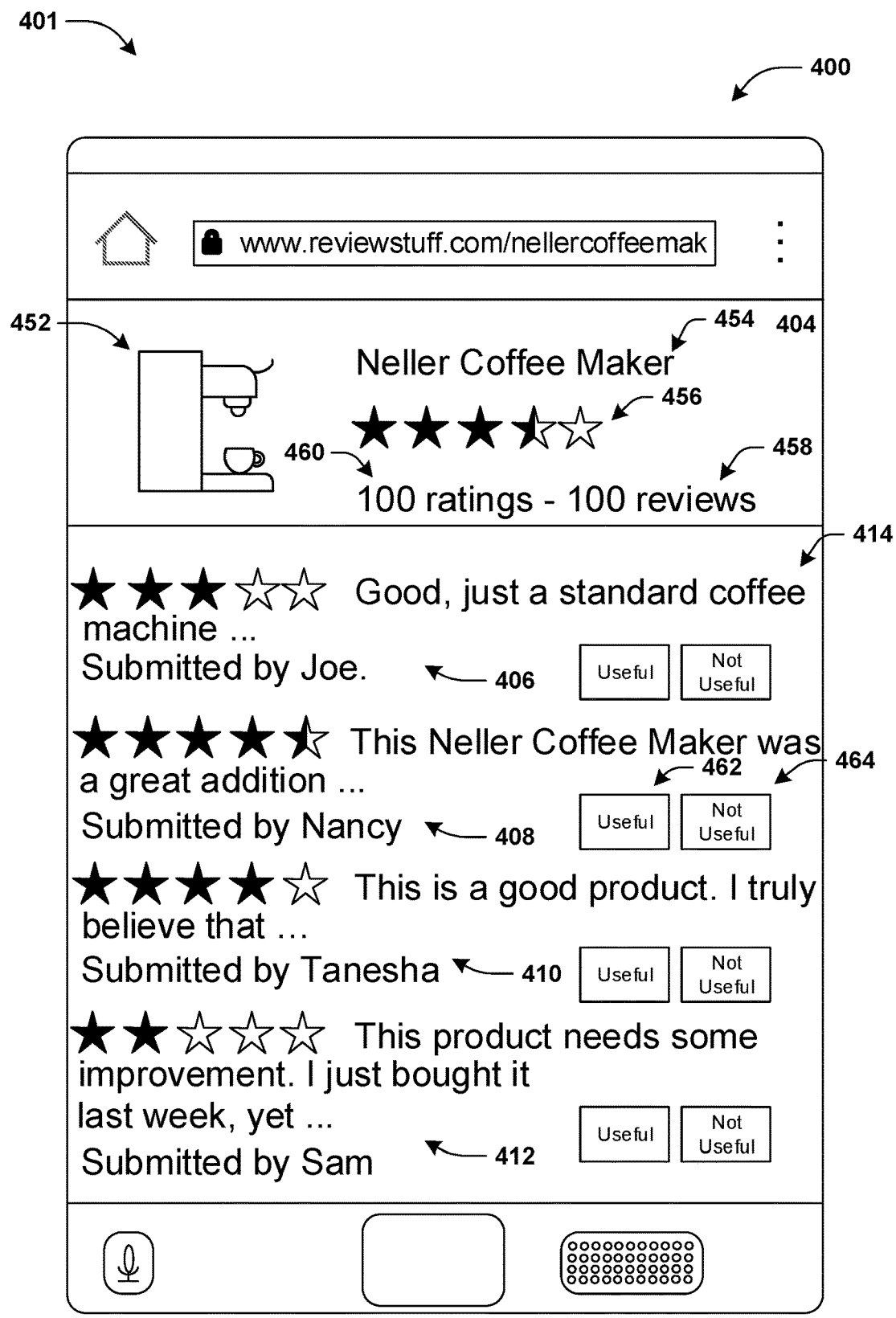
FIG. 4A is a component block diagram illustrating an exemplary system for presenting reviews and/or ratings associated with items, where a client device presents and/or accesses a web page corresponding to a first item review page.
Figure 4B:
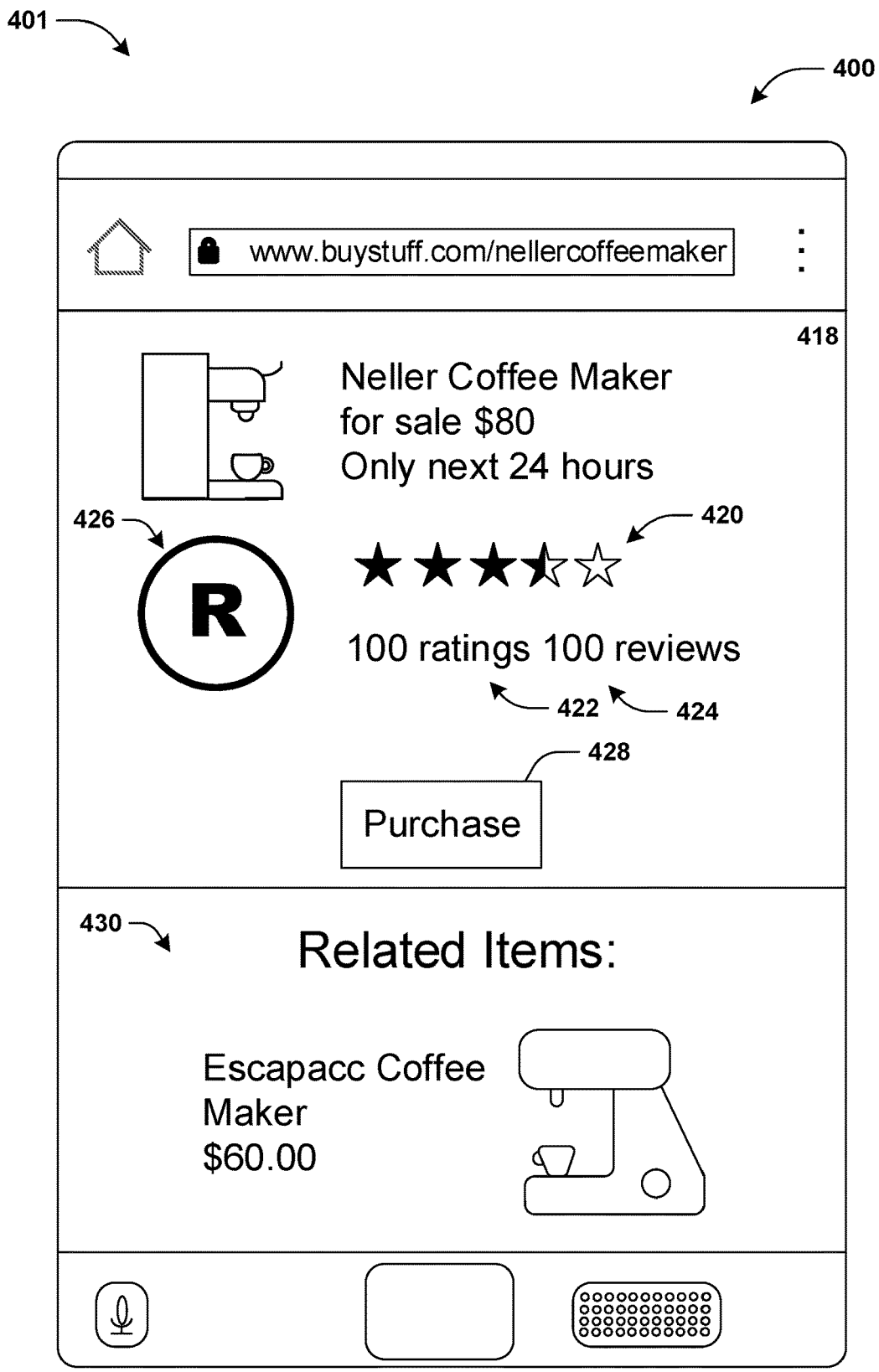
FIG. 4B is a component block diagram illustrating an exemplary system for presenting reviews and/or ratings associated with items, where a client device presents and/or accesses a web page corresponding to a first item product page.

FIGS. 4A-4B illustrate examples of a system 401 for presenting reviews and/or ratings associated with items, described with respect to the example method 100 of FIG. 1. A user, such as user Jane, and/or a third client device 400 associated with the user, may access and/or interact with an interface of the review system.

FIG. 4A illustrates the third client device 400 presenting and/or accessing a fifth web page 404 using a browser of the third client device 400. The fifth web page 404 may correspond a first item review page associated with the first item. The fifth web page 404 may comprise a title 454 of the first item, an image 452 of the first item, and/or a description of the first item. Alternatively and/or additionally, the fifth web page 404 may display a list of reviews 414 of the first item. The list of reviews 414 may comprise a plurality of reviews of the first item. The plurality of reviews of the first item may comprise the first review 408 of the first item submitted by the first reviewer and/or one or more reviews of the first item received from one or more client devices via the review system. In some examples, the first review 408 may be displayed via the fifth web page 404 and/or may be included in the list of reviews 414 responsive to a determination that the first review 408 and/or the first rating are approved by the review system. The one or more client devices from which the one or more reviews are received may be associated with one or more reviewers of the plurality of reviewers to which the first item is assigned for review. In an example, the list of reviews 414 may comprise the first review 408 by the first reviewer, a second review 406, a third review 410, a fourth review 412 and/or one or more other reviews. In some examples, the fifth web page 404 may display a plurality of ratings of the first item (such as represented by filled, semi-filled, and/or empty stars). The plurality of ratings may comprise the first rating (e.g., 4.5 out of 5 represented by 4 filled starts and one half-filled star) of the first item submitted by the first reviewer and/or one or more ratings of the first item received from the one or more client devices via the review system. A rating submitted by a reviewer may be displayed adjacent to a review, submitted by the reviewer, of the list of reviews 414.

In some examples, the fifth web page 404 may display an indication 458 of a quantity of reviews of the plurality of reviews of the first item. Alternatively and/or additionally, the fifth web page 404 may display an indication 460 of a quantity of ratings of the plurality of ratings of the first item. In some examples, a first item rating associated with the first item may be generated based upon the plurality of ratings of the first item. The fifth web page 404 may display an indication 456 of the first item rating (e.g., 3.5 out of 5 represented by 3 filled stars, one half-filled star and one empty star). In some examples, the fifth web page 404 may display a plurality of sets of reaction selectable inputs. For example, a set of reaction selectable inputs of the plurality of sets of reaction selectable inputs (and/or each set of reaction selectable inputs of the plurality of sets of reaction selectable inputs) may be displayed adjacent a review of the plurality of reviews. In some examples, a first set of reaction selectable inputs associated with the first review 408 may comprise one or more reaction selectable inputs, such as a positive reaction selectable input 462 (e.g., "Useful" button) and/or a negative reaction selectable input 464 (e.g., "Not Useful" button). A selection of the positive reaction selectable input 462 may be received via the third client device 400. The selection of the positive reaction selectable input 462 may correspond to an indication that the first review 408 is helpful to the user of the third client device 400 (such as for deciding whether to purchase the first item). Alternatively and/or additionally, a selection of the negative reaction selectable input 464 may be received via the third client device 400. The selection of the negative reaction selectable input 464 may correspond to an indication that the first review 408 is not helpful to the user of the third client device 400.

In some examples, the first item rating may be determined by performing one or more operations (e.g., mathematical operations) using the plurality of ratings of the first item (such as by averaging the plurality of ratings). Alternatively and/or additionally, the first item rating may be determined based upon the plurality of ratings and/or a plurality of weights associated with the plurality of ratings. For example, a first weight of the plurality of weights may be associated with the first review 408.

In some examples, the first weight may be determined based upon the one or more item categories associated with the first item, the one or more item category scores, the one or more reviewer categories associated with the first reviewer and/or the one or more reviewer category scores.

For example, the first weight may be determined based upon the quantity of the one or more matching categories that are comprised in both the one or more item categories and the one or more reviewer categories. For example, the first weight may be a function of the quantity of the one or more matching categories and/or one or more other values, where the first weight may increase with an increase of the quantity of the one or more matching categories. Alternatively and/or additionally, the first weight may be determined based upon the first proportion. For example, the first weight may be a function of the first proportion and/or one or more other values, where the first weight may increase with an increase of the first proportion. Alternatively and/or additionally, the first weight may be determined based upon the second proportion. For example, the first weight may be a function of the second proportion and/or one or more other values, where the first weight may increase with an increase of the second proportion. Alternatively and/or additionally, the first weight may be determined based upon the one or more first item category scores associated with the one or more matching categories and the first item and/or the one or more first reviewer category scores associated with the one or more matching categories and the first reviewer. Alternatively and/or additionally, the first weight may be determined based upon the one or more differences between the one or more first item category scores and the one or more first reviewer category scores. For example, the first weight may be a function of the one or more differences and/or one or more other values, where the first weight may decrease with an increase of a difference of the one or more differences. Alternatively and/or additionally, the first weight may be determined based upon the category similarity score. For example, the first weight may be a function of the category similarity score and/or one or more other values, where the first weight may increase with an increase of the category similarity score. Alternatively and/or additionally, the first weight may be determined based upon the characteristic similarity score. For example, the first weight may be a function of the characteristic similarity score and/or one or more other values, where the first weight may increase with an increase of the characteristic similarity score. Alternatively and/or additionally, the first weight may be determined based upon the reviewer suitability score. For example, the first weight may be a function of the reviewer suitability score and/or one or more other values, where the first weight may increase with an increase of the reviewer suitability score.

Alternatively and/or additionally, the first weight may be determined based upon a second review score associated with the first review 408. For example, the second review score may correspond to a quality of the first review 408. The second review score may be determined based upon a length of the first review 408 (e.g., the length may correspond to the word count and/or the character count of the first review 408). Alternatively and/or additionally, the second review score may be determined based upon at least one of an amount of information and/or details of the first item provided in the first review 408, whether the first review 408 contains language and/or terms appropriate for describing the first item, whether pros and/or cons of the first item are provided in the first review 408, etc. which may be determined by analyzing the first review 408 using one or more language processing techniques, one or more machine learning techniques and/or other techniques. Alternatively and/or additionally, the second review score may be determined based upon reactions to the first review 408 indicated by other users. For example, the second review score may be determined based upon an amount of positive reactions to the first review 408 (e.g., an amount of selections of the positive reaction selectable input 462) and/or an amount of negative reactions to the first review 408 (e.g., an amount of selections of the negative reaction selectable input 464). In some examples, the first weight may be a function of the reviewer suitability score and/or one or more other values, where the first weight may increase with an increase of the reviewer suitability score.

In some examples, the plurality of weights associated with the plurality of reviews of the first item may comprise the first weight associated with the first review 408 and/or one or more other weights associated with one or more other reviews of the plurality of reviews. The one or more other weights may be determined using one or more of the techniques herein, such as described with respect to determining the first weight. In some examples, the plurality of weights may be determined using one or more machine learning techniques and/or other techniques.

In some examples, the first item rating may be determined based upon the plurality of ratings and the plurality of weights such that, in determining the first item rating, ratings with higher weights of the plurality of weights are emphasized over ratings with lower weights of the plurality of weights. In an example, the first weight associated with the first rating may be higher than a second weight associated with a second rating of the plurality of ratings, and thus, the first rating may be emphasized over the second rating in determining the first item rating. In some examples, one or more operations (e.g., mathematical operations) may be performed using the plurality of ratings of the first item and/or the plurality of weights associated with the plurality of ratings to determine the first item rating (such as by determining a weighted mean of the plurality of ratings using the plurality of weights).

In some examples, the list of reviews 414 may be ordered and/or arranged based upon the plurality of weights associated with the plurality of reviews. For example, a review of the plurality of reviews associated with a higher weight may be displayed higher in the list of reviews 414 than a review of the plurality of reviews associated with a lower weight. In an example, the second review 406 may be arranged higher than the first review 408 in the list of reviews 414 based upon a determination that a second weight associated with the second review 406 is higher than the first weight associated with the first review 408.

FIG. 4B illustrates the third client device 400 presenting and/or accessing a sixth web page 418 using a browser of the third client device 400. The sixth web page 418 may correspond to a first item product page of a shopping platform, for example. The sixth web page 418 may comprise a title of the first item, an image of the first item, a price of the first item, and/or a description of the first item. Alternatively and/or additionally, the sixth web page 418 may display a second indication 424 of the quantity of reviews of the plurality of reviews of the first item. Alternatively and/or additionally, the sixth web page 418 may display a second indication 422 of the quantity of ratings of the plurality of ratings of the first item. Alternatively and/or additionally, the sixth web page 418 may display a second indication 420 of the first item rating. Alternatively and/or additionally, the sixth web page 418 may display a selectable input 428 (e.g., a purchase button) associated with purchasing the first item. For example, the first item may be purchased responsive to a selection of the selectable input 428. Alternatively and/or additionally, the sixth web page 418 may display a review platform logo 426 associated with the review platform interface. The review platform logo 426 may be adjacent to and/or within a threshold distance from the second indication 424 of the quantity of reviews, the second indication 422 of the quantity of ratings and/or the second indication 420 of the first item rating. In some examples, the review platform logo 426 may comprise a link to the first item review page (e.g., the fifth web page 404). For example, responsive to a selection of the review platform logo 426, the first item review page may be accessed and/or presented via the third client device 400. The sixth web page 418 may display a related items section 430 comprising information associated with one or more items (e.g., products and/or services) related to the first item.

In some examples, reviews and/or ratings by the first reviewer may be analyzed to identify one or more patterns. For example, the one or more patterns may be determined using artificial intelligence, one or more machine learning techniques and/or other techniques. In some examples, the first reviewer may be evaluated based upon the one or more patterns. For example, a performance of the first reviewer in reviewing items (and/or a quality of reviews by the first reviewer) may be determined based upon the one or more patterns. In an example, the first reviewer may be determined to be an inadequate reviewer based upon an identification of a pattern of leaving similar ratings across a wide range of reviewed items (such as exclusively leaving 1 star or 5 star ratings). In some examples, the first reviewer may be flagged and/or banned responsive to determining that the first reviewer is an inadequate reviewer.

In some examples, the first reviewer may be flagged for a first period of time (e.g., at least one of 1 week, 2 weeks, etc.). In some examples, while the first reviewer is flagged (e.g., during the first period of time), the first reviewer may be prohibited from at least one of requesting to review items, being assigned items for review, submitting reviews and/or ratings associated with items, receiving reimbursement, etc. In some examples, while the first reviewer is flagged, a system administrator of the review system may un-flag the first reviewer.

Alternatively and/or additionally, the first reviewer may be flagged responsive to determining that a review, submitted to the review system by the first reviewer (and/or the second client device), comprises inappropriate and/or offensive content (e.g., offensive language). Alternatively and/or additionally, the first reviewer may be flagged responsive to determining that a threshold number of reviews, submitted to the review system by the first reviewer (and/or the second client device), comprise inappropriate and/or offensive content (e.g., offensive language). Alternatively and/or additionally, the first reviewer may be flagged responsive to determining that the first reviewer submitted a review of an item to the review system without using the item. Alternatively and/or additionally, the first reviewer may be flagged responsive to determining that the first reviewer submitted a non-descriptive review of an item to the review system. Alternatively and/or additionally, the first reviewer may be flagged responsive to determining that the first reviewer submitted an untruthful review of an item to the review system. Alternatively and/or additionally, the first reviewer may be flagged responsive to determining that users express more negative reactions to one or more reviews submitted by the first reviewer than positive reactions to the one or more reviews (which may indicate that reviews submitted by the first reviewer are not helpful to users that read the reviews). Alternatively and/or additionally, the first reviewer may be flagged responsive to determining that review scores (e.g., the second review score) associated with one or more reviews submitted by the first reviewer do not meet a threshold review score (which may indicate that reviews submitted by the first reviewer are of low quality). Alternatively and/or additionally, the first reviewer may be flagged responsive to one or more reviews submitted by the first reviewer not being approved by the review system for presentation. Alternatively and/or additionally, the first reviewer may be flagged responsive to determining that the first reviewer at least one of did not purchase the first item within the first time window, did not submit a review of the first item within the second time window, or did not submit a rating of the first item within the third time window. In some examples, the first reviewer may be banned responsive to the first reviewer being flagged a threshold quantity of times. In some examples, the first reviewer may be banned indefinitely or for a second period of time (such as longer than the first period of time). In some examples, while the first reviewer is banned, the first reviewer may be prohibited from at least one of requesting to review items, being assigned items for review, submitting reviews and/or ratings associated with items, receiving reimbursement, etc.

In some examples, the review system may assign the first reviewer (and/or other reviewers associated with the review system) a score associated with points. In some examples, items associated with the review system are associated with varying quantities of points. In some examples, a first quantity of points may be awarded to the first reviewer responsive to submitting a review and/or a rating of an item to the review system. In some examples, the first quantity of points may be awarded based upon a popularity of the item, where a higher popularity of the item corresponds to a lower quantity of the first quantity of points. For example, a television having a high popularity may correspond to 2 points, whereas a specialty water filter having a lower popularity may correspond to 10 points. In some examples, extra points may be awarded to the first reviewer for submitting content other than text (e.g., one or more images and/or one or more videos) with the review. Alternatively and/or additionally, the first reviewer may be awarded points for inviting other users to use the review system. In some examples, the score of the first reviewer may be reduced responsive to determining that the first reviewer is an inadequate reviewer. Alternatively and/or additionally, the score of the first reviewer may be reduced responsive to responsive to determining that a review, submitted to the review system by the first reviewer (and/or the second client device), comprises inappropriate and/or offensive content (e.g., offensive language). Alternatively and/or additionally, the score of the first reviewer may be reduced responsive to determining that the first reviewer submitted a review of an item to the review system without using the item. Alternatively and/or additionally, the score of the first reviewer may be reduced responsive to determining that the first reviewer submitted a non-descriptive review of an item to the review system. Alternatively and/or additionally, the score of the first reviewer may be reduced responsive to determining that the first reviewer submitted an untruthful review of an item to the review system. Alternatively and/or additionally, the score of the first reviewer may be reduced responsive to determining that users express more negative reactions to one or more reviews submitted by the first reviewer than positive reactions to the one or more reviews. Alternatively and/or additionally, the score of the first reviewer may be reduced responsive to determining that review scores (such as the second review score) associated with one or more reviews submitted by the first reviewer do not meet a threshold review score. Alternatively and/or additionally, the score of the first reviewer may be reduced responsive to one or more reviews submitted by the first reviewer not being approved by the review system for presentation. In some examples, the points awarded to the first reviewer may be summed to determine the score. In some examples, a reviewer level associated with the first reviewer may be determined based upon the score. For example, the first reviewer may be associated with a first reviewer level (e.g., a golden reviewer level) responsive to a determination that the score exceeds a first threshold score. Alternatively and/or additionally, the first reviewer may be associated with a second reviewer level (e.g., a silver reviewer level) responsive to a determination that the score is less than the first threshold score and exceeds a second threshold score. Alternatively and/or additionally, the first reviewer may be associated with a third reviewer level (e.g., a standard reviewer level) responsive to a determination that the score is less than the second threshold score. Reviewers associated with the first reviewer level may be approved for reviewing a wider range of items, more popular items and/or more expensive items than reviewers associated with the second reviewer level. Alternatively and/or additionally, reviewers associated with the second reviewer level may be approved for reviewing a wider range of items, more popular items and/or more expensive items than reviewers associated with the third reviewer level.

In some examples, notifications may be transmitted (such as to the second client device) via the review platform interface to alert the first reviewer that they have been approved to review an item. In some examples, notifications may be transmitted (such as to the second client device) via the review platform interface to alert the first reviewer that a purchasing window (e.g., the first time window) at least one of will end within a threshold duration of time, will begin within a threshold duration of time, has ended, etc. Alternatively and/or additionally, notifications may be transmitted (such as to the second client device) via the review platform interface to alert the first reviewer that a reviewing window (e.g., the second time window) and/or a rating window (e.g., the third time window) at least one of will end within a threshold duration of time, will begin within a threshold duration of time, has ended, etc. Alternatively and/or additionally, the review platform interface may comprise a calendar that comprises indications of purchasing windows associated with items to be reviewed by the first reviewer, reviewing windows associated with items to be reviewed by the first reviewer and/or rating windows associated with items to be reviewed by the first reviewer.

In some examples where the review system uses a machine learning model to determine at least one of the one or more item category scores, the one or more reviewer category scores, review scores, whether the first reviewer is associated with the first target audience, the reviewer suitability score, the plurality of weights, etc., the machine learning model may be trained using training data to adjust a set of feature weights of the machine learning model. For example, the training data may comprise review scores (such as the second review score) associated with reviews (e.g., review scores associated with reviews that are collected and/or presented by the review system, for example), reviewer profiles (such as the first reviewer profile) associated with reviewers, target profiles (such as the first target profile) associated with items to be reviewed, etc. The machine learning model may be trained, using the training data and/or an optimization function, to optimize review scores associated with reviews. Accordingly, items may be more accurately assigned for review to reviewers such that reviews and/or ratings collected and/or presented by the review system increase in quality.

It may be appreciated that the disclosed subject matter may assist a user in viewing authentic and/or accurate reviews and/or ratings associated with items such that the user can more accurately determine a quality of an item using the reviews and/or ratings and/or make an informed decision on whether to purchase the item.

Implementation of at least some of the disclosed subject matter may lead to benefits including, but not limited to, providing authentic, more useful and/or more accurate reviews and/or ratings (e.g., as a result of approving the first reviewer to review the first item based upon a determination that the first reviewer is associated with the first target audience, as a result of approving the first reviewer to review the first item based upon a determination that the reviewer suitability score exceeds a threshold reviewer suitability score, as a result of taking into account review scores associated with previous reviews when approving the first reviewer to review the first item, etc. to ensure that reviews submitted from reviewers approved to review the first item are more descriptive, higher quality and more useful for making informed decisions on whether to purchase an item, etc.).

Alternatively and/or additionally, implementation of at least some of the disclosed subject matter may lead to benefits including, but not limited to, increased generalized revenue (e.g., as a result of presenting authentic reviews that are descriptive, higher quality and useful, without presenting reviews with inaccurate information and without presenting positive reviews that are left by reviewers merely to receive compensation for the positive reviews, such that buyers may spend more due to an increase in trust of the reviews).

Alternatively and/or additionally, implementation of at least some of the disclosed subject matter may lead to benefits including, but not limited to, enabling an entity to release a limited quantity of items using the review system, and receive early customer feedback from reviewers that are associated with a target audience, without having to manually find the reviewers associated with the target audience. Such early customer feedback may be of use for plans of launching the items and/or for improving the items.

In some examples, at least some of the disclosed subject matter may be implemented on a client device, and in some examples, at least some of the disclosed subject matter may be implemented on a server (e.g., hosting a service accessible via a network, such as the Internet).

Figure 5:
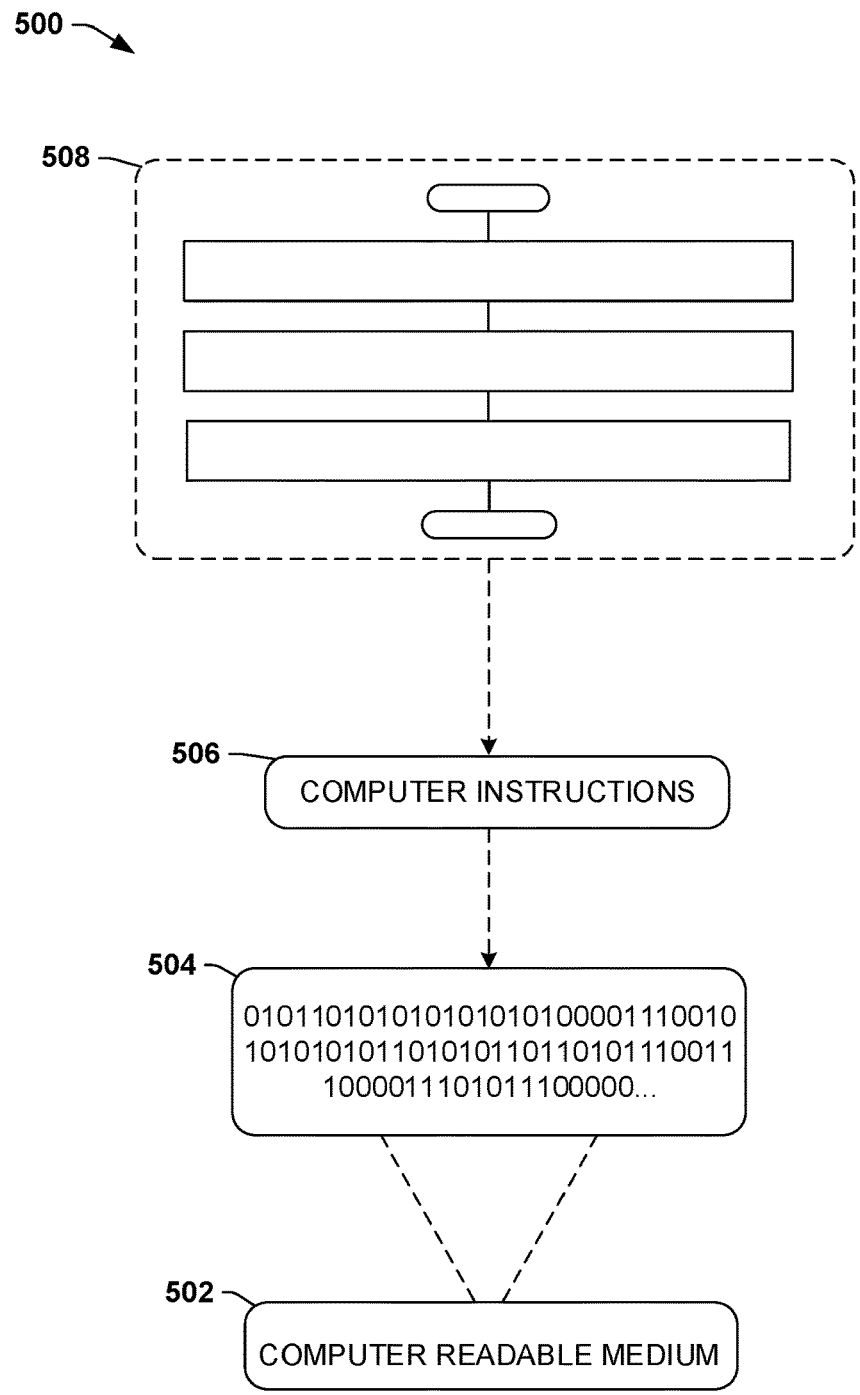
FIG. 5 is an illustration of an exemplary computer-readable medium comprising processor-executable instructions, wherein the processor executable instructions may be configured to embody one or more of the provisions set forth herein.
Figure 6:
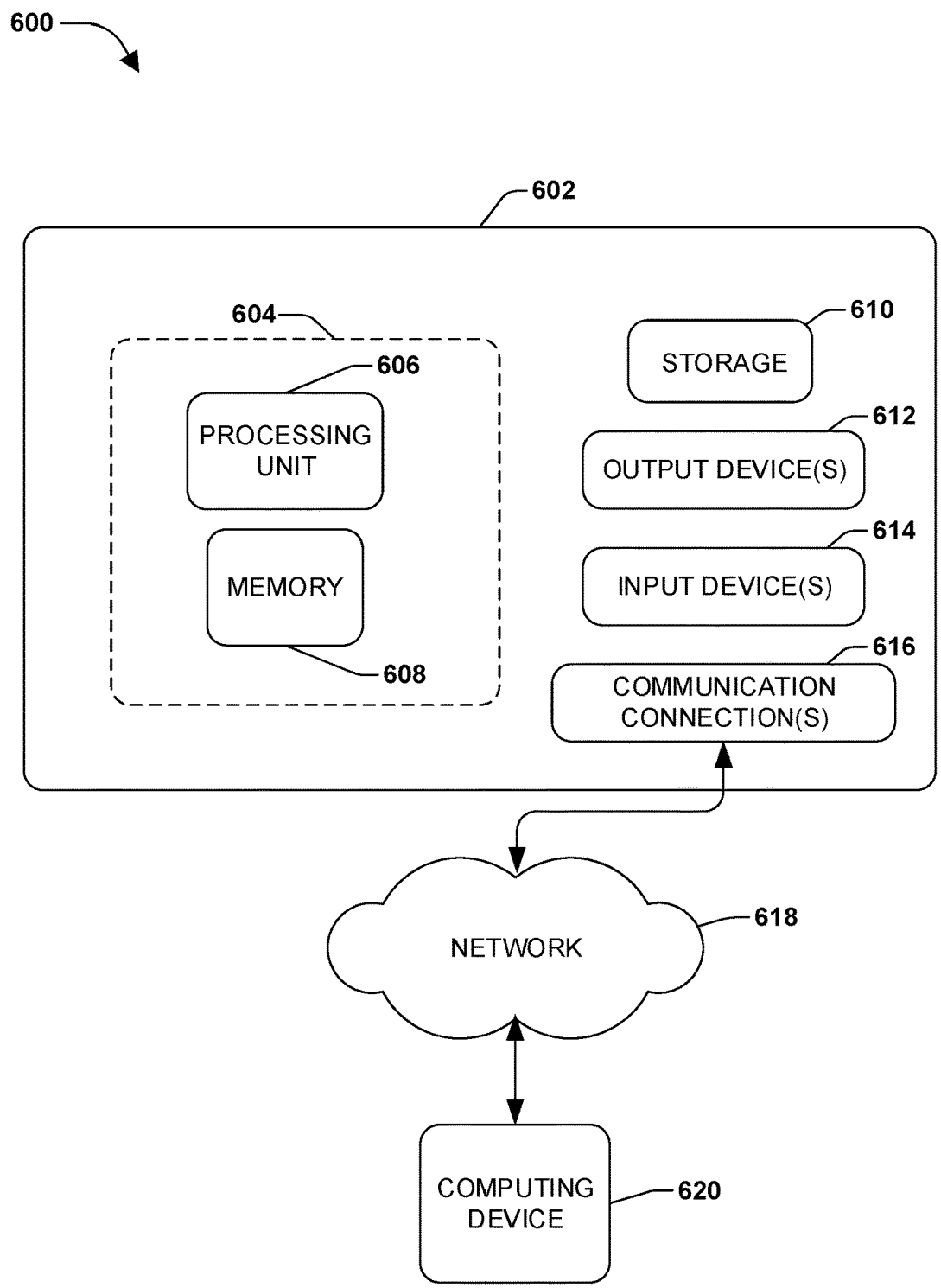
FIG. 6 illustrates an exemplary computing environment wherein one or more of the provisions set forth herein may be implemented.

Another embodiment involves a computer-readable medium comprising processor-executable instructions. The processor-executable instructions may be configured to implement one or more of the techniques presented herein. An exemplary computer-readable medium that may be devised in these ways is illustrated in FIG. 5. An implementation 500 may comprise a computer-readable medium 502 (e.g., a CD, DVD, or at least a portion of a hard disk drive), which may comprise encoded computer-readable data 504. The computer-readable data 504 comprises a set of computer instructions 506 configured to operate according to one or more of the principles set forth herein. In one such embodiment 500, the processor-executable computer instructions 506 may be configured to perform a method, such as at least some of the exemplary method 100 of FIG. 1, for example. In another such embodiment, the processor-executable instructions 506 may be configured to implement a system, such as at least some of the exemplary system 201 of FIGS. 2A-2D, at least some of the exemplary system 301 of FIGS. 3A-3D, and/or at least some of the exemplary system 401 of FIGS. 4A-4B, for example. Many such computer-readable media 502 may be devised by those of ordinary skill in the art that are configured to operate in accordance with the techniques presented herein. FIG. 6 and the following discussion provide a description of a suitable computing environment to implement embodiments of one or more of the provisions set forth herein. The operating environment of FIG. 6 is just one example of a suitable operating environment and is not intended to indicate any limitation as to the scope of use or functionality of the operating environment. Example computing devices include, but are not limited to, server computers, mainframe computers, personal computers, hand-held or laptop devices, mobile devices (such as mobile phones, Personal Digital Assistants (PDAs), media players, and the like), consumer electronics, multiprocessor systems, mini computers, distributed computing environments that include any of the above systems or devices, and the like.

Although not required, embodiments are described in the general context of "computer readable instructions" being executed by one or more computing devices. Computer readable instructions may be distributed using computer readable media (discussed below). Computer readable instructions may be implemented as programs and/or program modules, such as functions, objects, Application Programming Interfaces (APIs), data structures, and the like, that execute particular tasks or implement particular abstract data types. Typically, the functionality of the computer readable instructions may be combined or distributed (e.g., as desired) in various environments.

FIG. 6 illustrates an example of a system 600 comprising a (e.g., computing) device 602. Device 602 may be configured to implement one or more embodiments provided herein. In an exemplary configuration, device 602 includes at least one processing unit 606 and at least one memory 608. Depending on the configuration and type of computing device, memory 608 may be volatile (such as RAM, for example), non-volatile (such as ROM, flash memory, etc., for example), or some combination of volatile and non-volatile. This configuration is illustrated in FIG. 6 by dashed line 604.

In other embodiments, device 602 may include additional features and/or functionality. For example, device 602 may further include additional storage (e.g., removable and/or non-removable) including, but not limited to, magnetic storage, optical storage, and the like. Such additional storage is illustrated in FIG. 6 by storage 610. In one embodiment, computer readable instructions to implement one or more embodiments provided herein may be in storage 610. Storage 610 may further store other computer readable instructions to implement an application program, an operating system, and the like. Computer readable instructions may be loaded in memory 608 for execution by processing unit 606, for example.

The term "computer readable media" as used herein includes computer storage media. Computer storage media includes volatile and/or nonvolatile, removable and/or non-removable media implemented in any method or technology for storage of information such as computer readable instructions or other data. Memory 608 and storage 610 are examples of computer storage media. Computer storage media may include, but is not limited to including, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store desired information and can be accessed by device 602. Any such computer storage media may be part of device 602.

Device 602 may further include communication connection(s) 616 that allows device 602 to communicate with other devices. Communication connection(s) 616 may include, but is not limited to including, a modem, a radio frequency transmitter/receiver, an integrated network interface, a Network Interface Card (NIC), a USB connection, an infrared port, or other interfaces for connecting device 602 to other computing devices. Communication connection(s) 616 may include a wireless connection and/or a wired connection. Communication connection(s) 616 may transmit and/or receive communication media.

The term "computer readable media" may include, but is not limited to including, communication media. Communication media typically embodies computer readable instructions and/or other data in a "modulated data signal" such as a carrier wave or other transport mechanism and includes any information delivery media. The term "modulated data signal" may correspond to a signal that has one or more of its characteristics set or changed in such a manner as to encode information in the signal.

Device 602 may include input device(s) 614 such as mouse, keyboard, voice input device, pen, infrared cameras, touch input device, video input devices, and/or any other input device. Output device(s) 612 such as one or more displays, speakers, printers, and/or any other output device may also be included in device 602. Input device(s) 614 and output device(s) 612 may be connected to device 602 using a wireless connection, wired connection, or any combination thereof. In one embodiment, an input device or an output device from another computing device may be used as input device(s) 614 or output device(s) 612 for device 602.

Components of device 602 may be connected by various interconnects (e.g., such as a bus). Such interconnects may include a Peripheral Component Interconnect (PCI), such as a Universal Serial Bus (USB), PCI Express, an optical bus structure, firewire (IEEE 1394), and the like. In another embodiment, components of device 602 may be interconnected by a network. In an example, memory 608 may be comprised of multiple (e.g., physical) memory units located in different physical locations interconnected by a network.

Storage devices utilized to store computer readable instructions may be distributed across a network. For example, a computing device 620 accessible using a network 618 may store computer readable instructions to implement one or more embodiments provided herein. Device 602 may access computing device 620 and download a part or all of the computer readable instructions for execution. Alternatively, device 602 may download pieces of the computer readable instructions, as needed, or some instructions may be executed at device 602 and some at computing device 620.

Various operations of embodiments are provided herein. In one embodiment, one or more of the operations described may comprise computer readable instructions stored on one or more computer readable media, which if executed by a computing device, will cause the computing device to perform the operations described. The order in which some or all of the operations are described should not be construed as to imply that these operations are order dependent. Alternative ordering will be appreciated by one skilled in the art having the benefit of this description. Further, it will be understood that not all operations are present in each embodiment provided herein.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

As used in this application, the terms "system", "component," "interface", "module," and the like are generally intended to refer to a computer-related entity, either hardware, software, a combination of hardware and software, or software in execution. For example, a component may be, but is not limited to being, an object, a process running on a processor, a processor, a program, an executable, a thread of execution, and/or a computer. By way of illustration, an application running on a controller and the controller can be a component. One or more components may reside within a thread of execution and/or process and a component may be distributed between two or more computers and/or localized on one computer.

Furthermore, the claimed subject matter may be implemented as an apparatus, method, and/or article of manufacture using standard programming and/or engineering techniques to produce hardware, firmware, software, or any combination thereof to control a computer that may implement the disclosed subject matter. The term "article of manufacture" as used herein is intended to encompass a computer program (e.g., accessible from any computer-readable device, carrier, or media). Of course, those skilled in the art will recognize many modifications may be made to this configuration without departing from the scope or spirit of the claimed subject matter.

Moreover, the word "exemplary" is used herein to mean serving as an example, illustration, or instance. Any design or aspect described herein as "exemplary" is not necessarily to be construed as advantageous over other designs or aspects. Rather, use of the word "exemplary" is intended to present concepts in a concrete fashion. As used in this application, the word "or" is intended to mean an inclusive "or" (e.g., rather than an exclusive "or"). That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the words "a" and "an" as used in this application and the appended claims may generally be construed to mean "one or more" (e.g., unless specified otherwise or clear from context to be directed to a singular form). Also, at least one of A or B or the like generally means A or B or both A and B. Furthermore, to the extent that the terms "includes", "having", "has", "with", or variants thereof are used in either the detailed description or the claims, such terms are intended to be inclusive in a manner similar to the term "comprising."

Although the disclosure has been shown and described with respect to one or more implementations, modifications and alterations will occur to others skilled in the art based (e.g., at least in part) upon a reading of this specification and the annexed drawings. The disclosure includes all such modifications and alterations. The disclosure is limited only by the scope of the following claims. In regard to the various functions performed by the above described components (e.g., resources, elements, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Additionally, while a particular feature of the disclosure may have been disclosed with respect to only one of several implementations, the particular feature may be combined with one or more other features of the other implementations as may be desired and/or advantageous for any given or particular application.

What is claimed is:

1. A method of a review system, comprising:
receiving, via a first client device associated with a first entity, a first request to perform a review procedure for a first item associated with the first entity;
receiving first target information from the first client device associated with the first entity, wherein the first target information comprises one or more characteristics of a first target audience of the first item;
responsive to receiving the first request, generating a first target profile associated with the first item based upon the first target information comprising the one or more characteristics of the first target audience of the first item;
controlling a graphical user interface of a second client device associated with a first reviewer to display a review platform interface comprising one or more selectable inputs associated with one or more items, wherein a first selectable input of the one or more selectable inputs is associated with the first item;
receiving a first request to review the first item from the second client device via a selection of the first selectable input;
determining training data comprising one or more review scores associated with one or more reviews, one or more reviewer profiles associated with one or more reviewers, and one or more target profiles associated with one or more items to be reviewed;
training, with the training data, a machine learning model to adjust a set of weights of the machine learning model, wherein one or more weights of the machine learning model correspond to one or more reviewer suitability scores;
evaluating, by a processor and using the machine learning model having the one or more weights that correspond to the one or more reviewer suitability scores, the first target profile associated with the first item and a first reviewer profile associated with the first reviewer to determine whether the first reviewer is associated with the first target audience of the first item;
responsive to determining that the first reviewer is associated with the first target audience of the first item, approving, by the processor, the first reviewer to review the first item; and responsive to approving the first reviewer to review the first item, transmitting review instructions, associated with reviewing the first item, to the second client device.

2. The method of claim 1, comprising:
receiving first target information from the first client device associated with the first entity, wherein the generating the first target profile is performed based upon the first target information associated with the first item.

3. The method of claim 1, wherein the first target information is indicative of at least one of:
one or more ages associated with the first target audience of the first item;
one or more locations associated with the first target audience of the first item;
one or more genders associated with the first target audience of the first item;
an education level associated with the first target audience of the first item;
user activity associated with the first target audience of the first item;
one or more past purchases associated with the first target audience of the first item;
one or more cookies associated with the first target audience of the first item;
one or more user interests associated with the first target audience of the first item;
one or more income levels associated with the first target audience of the first item;
one or more social status levels associated with the first target audience of the first item;
one or more ethnicities associated with the first target audience of the first item;
one or more shopping habits associated with the first target audience of the first item;
one or more physical features associated with the first target audience of the first item;
one or more body types associated with the first target audience of the first item;
one or more household characteristics associated with the first target audience of the first item; or
one or more occupations associated with the first target audience of the first item.

4. The method of claim 1, comprising:
receiving, from the second client device associated with the first reviewer, first reviewer information associated with the first reviewer; and
generating the first reviewer profile based upon the first reviewer information associated with the first reviewer, wherein the first reviewer information is indicative of at least one of:
an age associated with the first reviewer;
a location associated with the first reviewer;
a gender associated with the first reviewer;
an education level associated with the first reviewer;
user activity associated with the first reviewer;
one or more past purchases associated with the first reviewer;
one or more cookies associated with the second client device;
one or more interests associated with the first reviewer;
an income level associated with the first reviewer;
a social status level associated with the first reviewer;
an ethnicity associated with the first reviewer;
one or more shopping habits associated with the first reviewer;
one or more physical features associated with the first reviewer;
a body type associated with the first reviewer;
one or more household characteristics associated with the first reviewer; or
an occupation associated with the first reviewer.

5. The method of claim 1, wherein the review instructions comprise at least one of:
instructions to purchase the first item;
instructions to use the first item;
instructions to submit, using at least one of the review platform interface or a shopping platform, a review of the first item that is based upon an experience of the first reviewer using the first item; or
instructions to submit, using at least one of the review platform interface or the shopping platform, a rating of the first item that is based upon the experience of the first reviewer using the first item.

6. The method of claim 5, comprising:
receiving at least one of a first review of the first item or a first rating of the first item from the second client device; and
reimbursing the first reviewer responsive to the receiving at least one of the first review of the first item or the first rating of the first item.

7. The method of claim 5, comprising:
receiving a first review of the first item from the second client device after the transmitting the review instructions to the second client device;
receiving one or more reviews of the first item from one or more client devices via the review system; and
displaying, via a first item review page associated with the first item, at least one of:
a plurality of reviews of the first item, wherein the plurality of reviews of the first item comprises the first review and the one or more reviews of the first item; or
an indication of a quantity of reviews of the plurality of reviews of the first item.

8. The method of claim 5, comprising:
receiving a first rating of the first item from the second client device after the transmitting the review instructions to the second client device;
receiving one or more ratings of the first item from one or more client devices via the review system;
generating, based upon a plurality of ratings of the first item, a first item rating, wherein the plurality of ratings of the first item comprises the first rating and the one or more ratings; and
displaying, via a first item review page associated with the first item, at least one of:
an indication of a quantity of ratings of the plurality of ratings of the first item; or
an indication of the first item rating.

9. The method of claim 7, comprising:
displaying, on a first item product page associated with purchasing the first item, a second indication of the quantity of reviews.

10. The method of claim 8, comprising:
displaying, on a first item product page associated with purchasing the first item, at least one of:
a second indication of the quantity of ratings; or
a second indication of the first item rating.

11. The method of claim 9, comprising:
displaying a second selectable input related to the first item review page on the first item product page;

receiving, from a third client device, a selection of the second selectable input; and responsive to receiving the selection of the second selectable input, displaying the first item review page via the third client device.

12. The method of claim 10, comprising:

displaying, on the first item product page, a review platform logo associated with the review platform interface, wherein the review platform logo is at least one of adjacent to or within a threshold distance of at least one of:

the second indication of the quantity of ratings; or the second indication of the first item rating.

13. A computing device comprising:

a processor; and memory comprising processor-executable instructions that when executed by the processor cause performance of operations, the operations comprising:

receiving, via a first client device associated with a first entity, a first request to perform a review procedure for a first item associated with the first entity;

determining one or more item categories associated with the first item;

generating, by the processor, one or more item category scores associated with the first item and the one or more item categories, wherein a first item category score of the one or more item category scores is at least one of indicative of or reflective of a relevance of a first item category of the one or more item categories to the first item and is generated based upon an evaluation of the first item category and one or more specifications of the first item;

receiving first reviewer information associated with a first reviewer;

determining one or more reviewer categories associated with the first reviewer based upon the first reviewer information;

determining, based upon the first reviewer information, one or more reviewer category scores, wherein:

the one or more reviewer category scores are associated with the first reviewer and the one or more reviewer categories; and a first reviewer category score of the one or more reviewer category scores is associated with the first reviewer and a first reviewer category of the one or more reviewer categories;

determining training data comprising one or more review scores associated with one or more reviews, one or more reviewer profiles associated with one or more reviewers, and one or more target profiles associated with one or more items to be reviewed;

training, with the training data, a machine learning model to adjust a set of weights of the machine learning model, wherein one or more weights of the machine learning model correspond to one or more reviewer suitability scores;

evaluating, by the processor and using the machine learning model having the one or more weights that correspond to the one or more reviewer suitability scores, (i) the one or more item category scores, comprising the first item category score, associated with the first item and (ii) the one or more reviewer category scores, comprising the first reviewer category score, associated with the first reviewer to determine whether the first reviewer is associated with a first target audience of the first item;

responsive to determining, by the processor, that the first reviewer is associated with the first target audience of the first item, controlling a graphical user interface of a second client device associated with the first reviewer to display a review platform interface comprising one or more selectable inputs associated with one or more items, wherein a first selectable input of the one or more selectable inputs is associated with the first item;

receiving a first request to review the first item from the second client device via a selection of the first selectable input; and transmitting review instructions, associated with reviewing the first item, to the second client device.

14. The computing device of claim 13, wherein the one or more item category scores evaluated to determine whether the first reviewer is associated with the first target audience of the first item comprises:

a second item category score that is at least one of indicative of or reflective of a relevance of a second item category to the first item and is generated based upon an evaluation of the second item category and the one or more specifications of the first item.

15. A non-transitory machine-readable medium having stored thereon processor-executable instructions that when executed cause performance of operations of a review system, the operations of the review system comprising:

receiving, via a first client device associated with a first entity, a first request to perform a review procedure for a first item associated with the first entity;

receiving first target information from the first client device associated with the first entity;

responsive to receiving the first request, generating a first target profile associated with the first item based upon the first target information;

controlling a graphical user interface of a second client device associated with a first reviewer to display a review platform interface comprising one or more selectable inputs associated with one or more items, wherein a first selectable input of the one or more selectable inputs is associated with the first item;

receiving a first request to review the first item from the second client device via a selection of the first selectable input;

determining training data comprising one or more review scores associated with one or more reviews, one or more reviewer profiles associated with one or more reviewers, and one or more target profiles associated with one or more items to be reviewed;

training, with the training data, a machine learning model to adjust a set of weights of the machine learning model, wherein one or more weights of the machine learning model correspond to one or more reviewer suitability scores;

evaluating, by a processor and using the machine learning model having the one or more weights that correspond to the one or more reviewer suitability scores, the first target profile associated with the first item and a first reviewer profile associated with the first reviewer to determine whether the first reviewer is associated with a first target audience of the first item;

responsive to determining that the first reviewer is associated with the first target audience of the first item, approving, by the processor, the first reviewer to review the first item;

responsive to approving the first reviewer to review the first item, transmitting review instructions, associated with reviewing the first item, to the second client device;

receiving a first review of the first item from the second client device after the transmitting the review instructions to the second client device;

receiving one or more reviews of the first item from one or more client devices via the review system;

receiving a first rating of the first item from the second client device after the transmitting the review instructions to the second client device;

receiving one or more ratings of the first item from the one or more client devices via the review system;

generating, based upon a plurality of ratings of the first item, a first item rating, wherein the plurality of ratings of the first item comprises the first rating of the first item received from the second client device and the one or more ratings of the first item received from the one or more client devices; and displaying, on a first item product page associated with purchasing the first item, at least two of:
  an indication of a quantity of reviews of a plurality of reviews of the first item, wherein the plurality of reviews of the first item comprises the first review received from the second client device and the one or more reviews of the first item received from the one or more client devices;
  an indication of a quantity of ratings of the plurality of ratings of the first item; or
  an indication of the first item rating.

16. The non-transitory machine readable medium of claim 15, the operations comprising:
displaying, on the first item product page, a review platform logo associated with the review platform interface, wherein the review platform logo on the first item product page comprises a link to a first item review page different than the first item product page, wherein the review platform logo is at least one of adjacent to or within a threshold distance from at least one of:
  the indication of the quantity of reviews of the plurality of reviews of the first item;
  the indication of the quantity of ratings of the plurality of ratings of the first item; or
  the indication of the first item rating.

17. The computing device of claim 13, wherein the first reviewer category score is at least one of indicative of or reflective of at least one of an expertise, a proficiency, a competence, an amount of experience or an amount of interest of the first reviewer with respect to items associated with the first reviewer category.

18. The non-transitory machine readable medium of claim 16, the operations comprising:
responsive to receiving a selection of the review platform logo, at least one of accessing or presenting the first item review page.

19. The non-transitory machine readable medium of claim 18, wherein the first item review page is on a different domain than the first item product page.

* * * * *